United States Patent [19]
Bertling et al.

[11] 3,904,056
[45] Sept. 9, 1975

[54] AGRICULTURAL VEHICLE

[75] Inventors: Alfred Bertling, Nordwalde;
Freidhelm Haselhoff, Reken, both of Germany

[73] Assignee: Wilhelm Kemper KG, Stadtlohn, Germany

[22] Filed: Mar. 14, 1973

[21] Appl. No.: 341,127

[30] Foreign Application Priority Data
Mar. 17, 1972 Germany............................ 2212914
Oct. 21, 1972 Germany............................ 2251801
Oct. 21, 1972 Germany............................ 2251802

[52] U.S. Cl. ............... 214/519; 214/83.36; 198/178; 198/280; 198/159
[51] Int. Cl. ............................................. B60p 1/38
[58] Field of Search ........... 214/519, 520, 521, 522, 214/83.34, 83.36, 508; 198/159, 178, 280

[56] References Cited
UNITED STATES PATENTS
3,010,593  11/1961  Adams et al. ....................... 214/519
3,252,564  5/1966  Stewart et al. ................... 198/159 X
3,303,918  2/1967  Larson ............................... 198/103
3,314,522  4/1967  Croall ............................. 198/33 AC
3,412,884  11/1968  Fischer .............................. 214/518
3,575,310  4/1971  Albertson ........................... 214/522

*Primary Examiner*—Frank E. Werner

[57]   ABSTRACT

An agricultural vehicle for storing bales, comprises a load space; a conveyor occupying and passing through said load space in a convoluted path; means for delivering bales to said conveyor at a bale-receiving position; and drive mechanism for advancing bales received on the conveyor in a series of steps each corresponding in length approximately to the longitudinal extent of the conveyor occupied by a bale, whereby bales received by the conveyor are stored therein within the load space until the load space is full.

29 Claims, 21 Drawing Figures

PATENTED SEP 9 1975 3,904,056

SHEET 2

PATENTED SEP 9 1975　　　　　　　　　　　3,904,056

SHEET　　　5

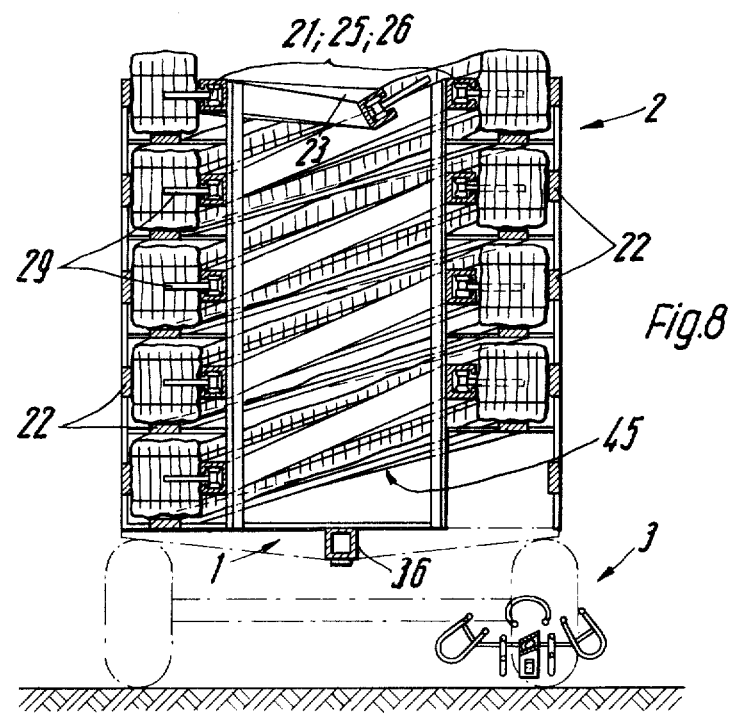
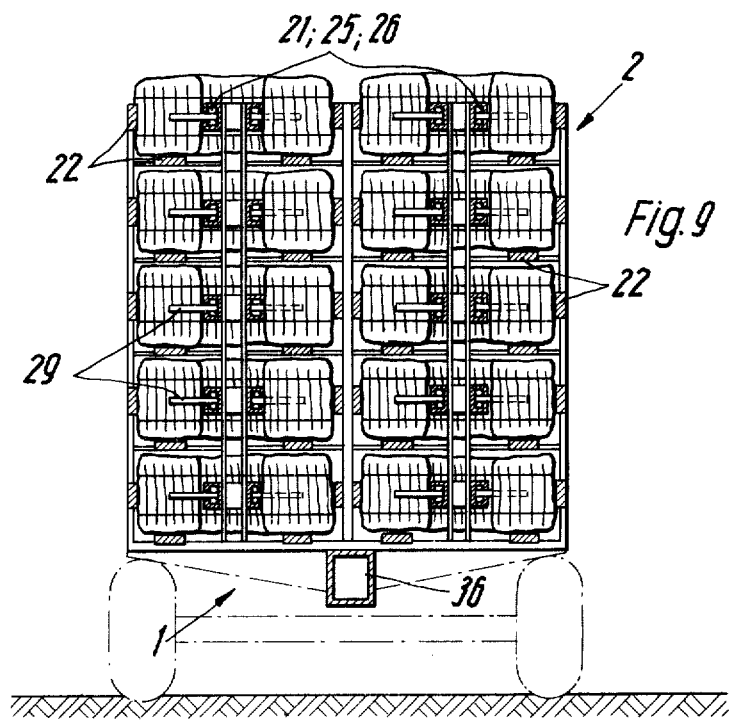

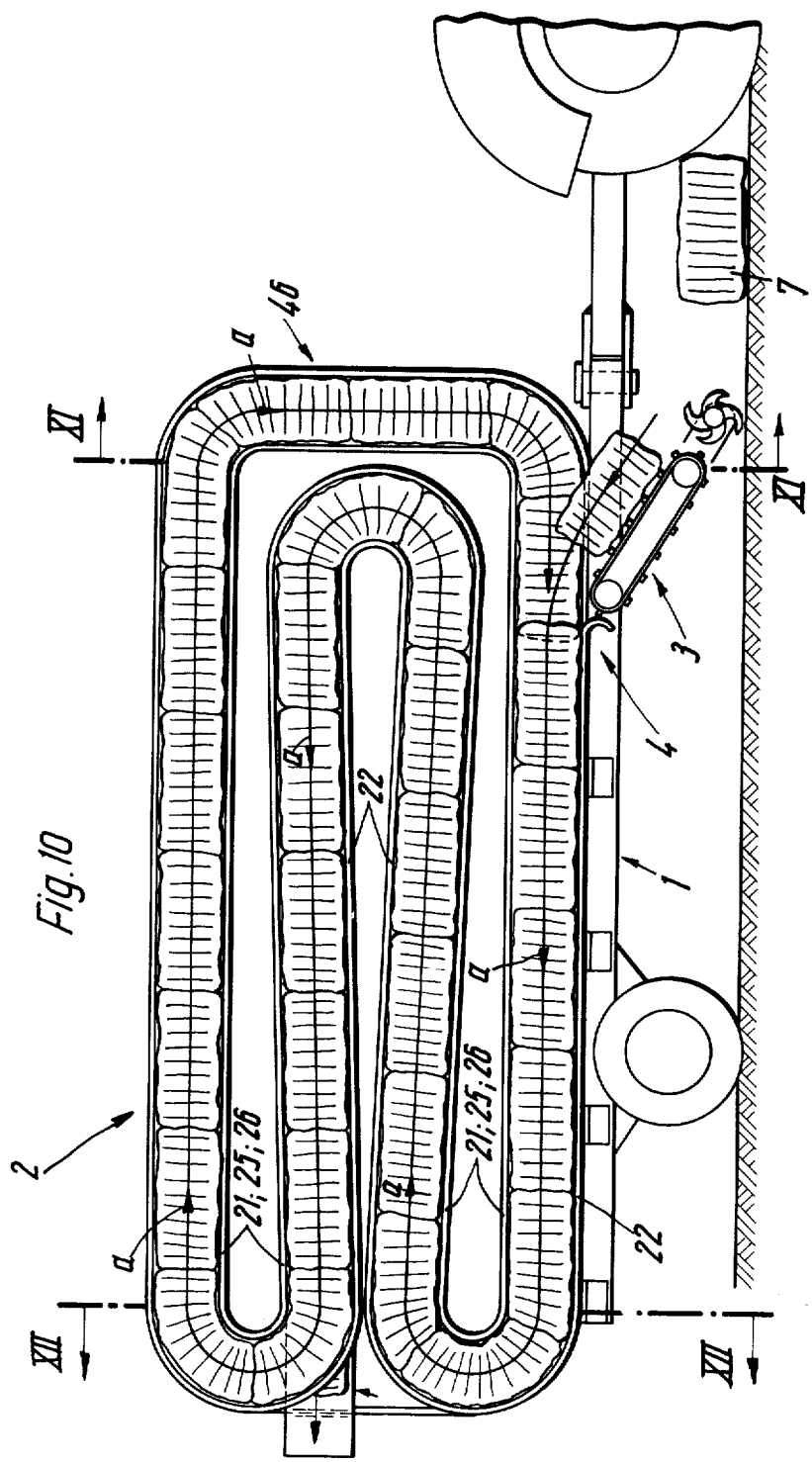

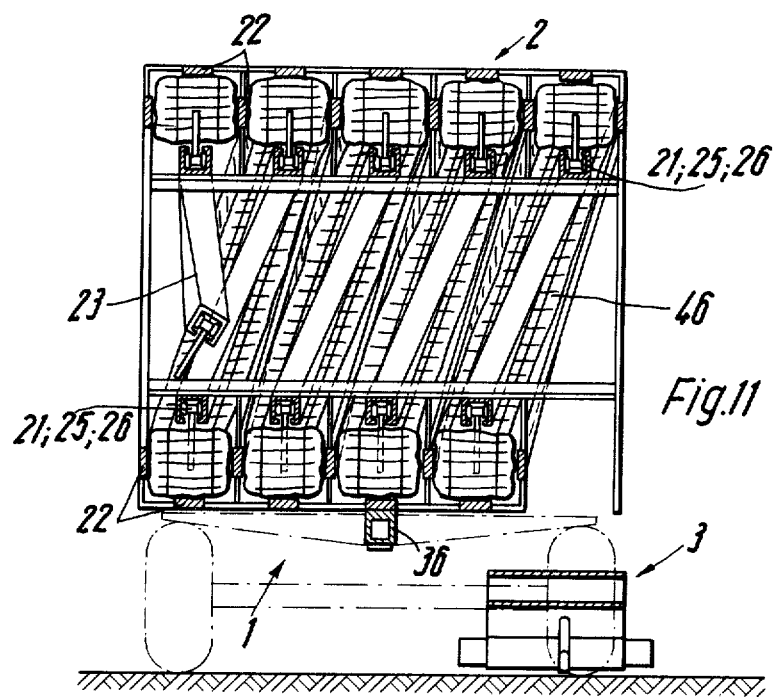
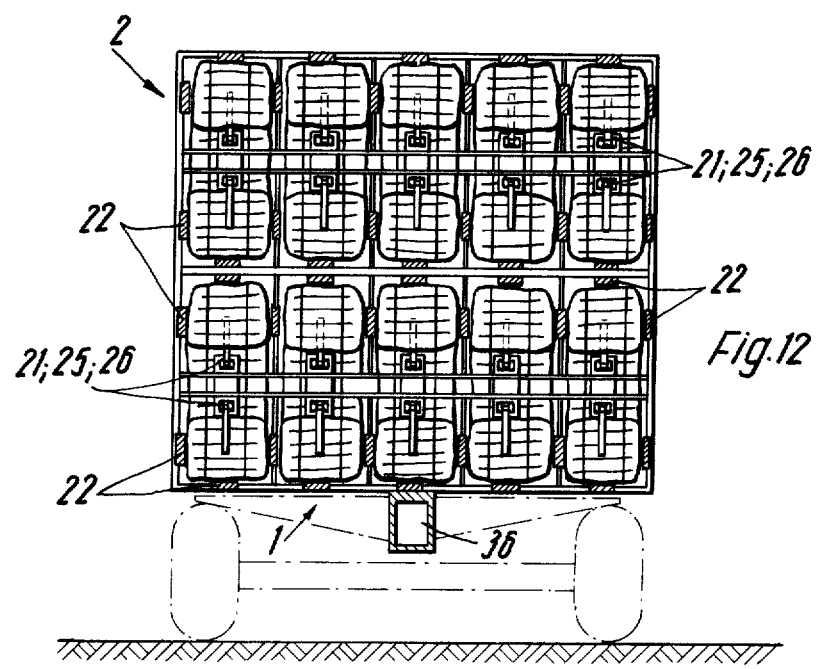

AGRICULTURAL VEHICLE

The present invention relates to an agricultural vehicle for picking up, loading and unloading bales of hay, straw or the like.

Vehicles of this kind, sometimes referred to as bale loaders, are already known. They make it possible to individually pick up and transfer to the loading surface the bales dropped by a high-pressure baler press and deposited upon the field; the loading surface generally consists of a scraper-flight or roller conveyor. To achieve the result that the load space within the vehicle is loaded with bales over its full width and height, is well known to first of all collect the bales picked up from the ground by the pick-up device, in a row, side by side, whose length corresponds to the width of the load space, and then in each case to shift the row thus formed, using special devices, upwards into the load space where, generally, a column of bales consisting of several such rows is built up and this, then, when it has reached the height of the load space, moved over the load surface to the end opposite the end at which the pick-up device is located, until ultimately the entire load space is occupied by a plurality of such bale columns. The pick-up device is in this context generally arranged at the forward end of the vehicle and the device for forming the rows of bales can be arranged transversely of the direction of travel of the vehicle, likewise at the forward end, or again, laterally, in the fore and aft direction of the vehicle, adjacent the load surface, in the latter instance, in each case a row of bales occupying the length of the load space being supplied to the load surface from the side.

These known bale loaders have the common drawback that when unloading the vehicle, the loaded bales either have to be unloaded individually from the vehicle by hand, or, as for example when using the scraper flight or roller conveyor for unloading, a disorderly heap of bales is produced from which individual bales are then removed by hand and have to be moved elsewhere, for example to a bale conveyor implement by which the bales are supplied to the hay loft or the like. This unloading operation is thus a labour-intensive and costly operation and, quite apart from the high purchase costs due to the relatively complex design, has meant that bale loaders of this kind have thus far found no practical application in agriculture.

The object of the present invention is to provide an agricultural vehicle for picking up, loading and unloading bales of hay, straw or the like, which, whilst having a relatively simple basic design and therefore the expectation of a substantially lower cost than conventional vehicles of this type, above all simplifies the unloading operations so that it becomes a one-man job which can be carried out independently without the need for further labour.

To resolve this problem, the invention provides in its broadest aspect an agricultural vehicle for storing bales, comprising: a load space; a conveyor occupying and passing through said load space in a convoluted path; means for delivering bales to said conveyor at a bale-receiving position; and drive mechanism for advancing bales received on the conveyor in a series of steps each corresponding in length approximately to the longitudinal extent of the conveyor occupied by a bale, whereby bales received by the conveyor are stored thereon within the load space until the load space is full.

In another aspect, the invention provides an agricultural vehicle for storing bales, comprising: a load space comprising a plurality of load sections; a mechanism for picking up the bales; a conveyor arranged to receive bales from said pick-up mechanism at a bale receiving position, said conveyor passing successively through the load sections in a convoluted path to a bale-discharge position; and drive mechanism for advancing the bales on the conveyor in a series to steps each corresponding in length approximately to the longitudinal extent of the conveyor occupied by a bale, whereby bales received by the conveyor are stored thereon within the load space until the load space is full, and are then discharged successively at the discharge position.

The endless conveyor passing through the load space thus in effect constitutes a conveyor magazine for storing the bales.

The individually picked up bales are thus no longer formed up in a stack on the load surface or deck of the vehicle, but gradually and individually pass in ordered sequence through the magazine forming the load space, until the latter is completely filled and the vehicle therefore loaded. The conveyor magazine individually holding the bales, then individually discharges them during unloading so that they pass from the conveyor magazine of the vehicle directly, or possibly through the intermediary of a bale conveyor, to the hay loft or the like without any human intervention being required. The entire operation of picking up and loading the bales, and subsequently unloading them, can therefore be carried out automatically as a one-man operation under the control of the tractor driver. Because the conveyor magazine forms the load space of the vehicle, the scraper-flight or roller conveyor otherwise usually provided to form the load surface or deck, can be dispensed with, and bacause furthermore, no special devices are any longer needed to build a stack of bales, the vehicle in accordance with the invention can overall be of a relatively simpler design and be manufactured at a comparatively lower price.

The load space may consist of a plurality of load sections, which may join each other sectionally or continuously. The load section can be disposed generally, horizontally or vertically in the load space and the endless conveyor in each case following a convoluted path in a section, such that it substantially fills out and covers the area of the section. It is particularly advantageous if, in accordance with a further feature of the invention, the area covered by the conveyor magazine is generally rectangular and is traversed by the conveyor in each case four times in a straight line in longitudinal direction, involving a total of three 180° changes of direction, and traversed once in a straight line in the transverse direction, with a total of two 90° changes in direction. This is especially important if the conveyor magazine is arranged horizontally in several joined levels, because in this fashion, within the framework of the vehicle width laid down by road traffic regulations (e.g., 2.50m), maximum exploitation of the area in each level is achieved. Preferentially, the transition of the conveyor magazine from one level to the next, whether the levels are vertically or horizontally arranged, will in each case take place along a straight section, preferably along the longest straight section in each case. In this way, the bends in the conveyor magazine can each be executed without any rise, and this constitutes a simplification from the design and manufacturing points of view.

With the arrangement of the conveyor magazine in several joining sections, as the sections either being horizontal or vertical ones, advantageously the picking up of the bales will take place at the bottom area of the load space and their discharge at the top. This has the advantage that the discharge height is already at around 3 m, so that the bales can be conveyed directly to the hay loft or the like, from the vehicle without the interposition of a vertical conveyor or hoist. This can be achieved particularly simply and at the same time matched to any differences in height between the top edge of the vehicle load space and the hay loft or the like, if, in accordance with a further feature of the invention, at the discharge end of the conveyor magazine a pivotable, longitudinally extensible chute is provided for control unloading. By means of this chute, the bales individually discharged from the conveyor magazine can be directed to the particular desired unloading point.

Alternatively, by reversing the direction of movement of the endless conveyor, the bales can also, after the load space has been filled, equally well be individually discharged through the pick-up mechanism or in the area of the entry point. Thus a separate bale discharge position is an optional feature.

The endless conveyor which forms the actual load space of the vehicle and can be constituted by a conveyor chain, a conveyor cable, a conveyor belt or some other similar conveyor device, will preferably be driven at least in the neighbourhood of the point where the bales are discharged, so that it consequently has a tension run extending from the point of pick up to the point of discharge. The traction-driven endless conveyor, throughout the entire loading operation, maintains the bales positively in position and at predetermined intervals one behind the other, whilst transporting them. Moreover, during unloading it completely unloads the bales i.e., it is ensured that no bale is left behind in the conveyor magazine. As mentioned, the question of the design of the endless conveyor provided for the conveyor magazine, is not a critical one; it is particularly advantageous, however, if the endless conveyor in accordance with a further feature of the invention, is made up of carriages equipped with bale drivers, linked together by cables or links and guided on rails. These carriages can do duty at the same time as the direct drive elements for the transmission arrangement which advantageously takes the form of at least one star wheel or chain wheel. A particularly advantageous embodiment is characterised in that the carriages forming the endless conveyor and articulated together at intervals from one another, exhibit an extension which partially and externally embraces the carriage rails with a certain clearance. Each extension is connected to the carriage beneath the rails and the rails closed at top and sides. By this design the result is achieved that any strands of straw or particles which drop off during the movement through the conveyor magazine are prevented from penetrating between the rails where they might bind and give rise to problems.

In accordance with yet another preferred feature of the invention, it is arranged that each bale passes through the conveyor magazine in such a way that the two planes defined by the binder strings of the bale, are located parallel to the conveyor plane. The bales can thus pass through the conveyor magazine "on edge" and in particular because of the arrangement of the conveyor magazine in several joining planes, this is advantageous from the space point of view and also has the effect that at the ends the most sharply rounded edges of the bale are located at the front in the particular direction of transportation. Preferentially the bales will be guided in addition to the conveyor by guide rails or walls which delimit a channel which in each case opens out at the bends and in the plane of the bends so that the bales negotiate the bend with only a small resistance. To achieve the result that each bale passes through the conveyor magazine in the indicated attitude, although this attitude is not normally that in which the bales arrive from the high-pressure baling press or are laid upon the field, it is furthermore provided in accordance with the invention that the bales are rotated into the desired conveying attitude at the time when they are picked up to be fed into the magazine. To this end, advantageously, for the bales a pick-up mechanism, with a conveyor and conveyor channel, will be used, in which conveyor channel they are twisted helically through at least 45°.

A final preferred feature is that the conveyor magazine and its endless conveyor are equipped with a drive arrangement in which the intermittent step-wise motion of the conveyor is controlled during loading by sensing the length of the particular bale picked up, but can be switched to operate independently of the bale length for unloading. This means that the bales in the conveyor magazine are only moved when a fresh bale is picked up, and indeed only by an extent sufficient to introduce the fresh bale into the conveyor magazine by the amount of its own length. In this fashion the conveyor magazine can be very compactly loaded with bales over its full length and thus the available load space fully exploited. When the bale first loaded finally reaches the end of the conveyor magazine, this end preferentially at the same time forming the bale discharge zone, a sensing device provided there can be used to trigger a signal and/or halt the conveyor magazine drive. The vehicle, with the conveyor magazine fully loaded, is then emptied or unloaded after switching the conveyor magazine drive to a possibly faster continuous operating mode.

As far as the drive is concerned, it is particularly advantageous if, in accordance with a further feature of the invention, one or more drive arrangements is or are provided in several or for that matter in each of the load levels of the magazine, for the endless conveyor, these drive systems then being operated intermittently and simultaneously as a function of the length of the particular bale picked up, and being switchable independently of the bale, to continuous operation. With this kind of design, the overall drive force required for the endless conveyor, is spread over several drive units, yielding more uniform application of the drive, and more favourable dimensioning of the drive shaft and endless conveyor itself, since the stresses in these components are reduced.

Other features and advantages of the invention will be apparent from the ensuing description taken in conjunction with the drawing where several embodiments of the subject of the invention have been illustrated by way of example in a schematic manner.

IN THE DRAWING

FIG. 8 is a cross section on the line VIII—VIII of FIG. 6;

FIG. 9 is a cross section on the line IX—IX of FIG. 6;

FIG. 10 is a side elevation of the third embodiment of the invention;

FIG. 11 is a section on the line XI—XI of FIG. 10.

FIG. 12 is a section on the line XII—XII of FIG. 10;

Figure 4:
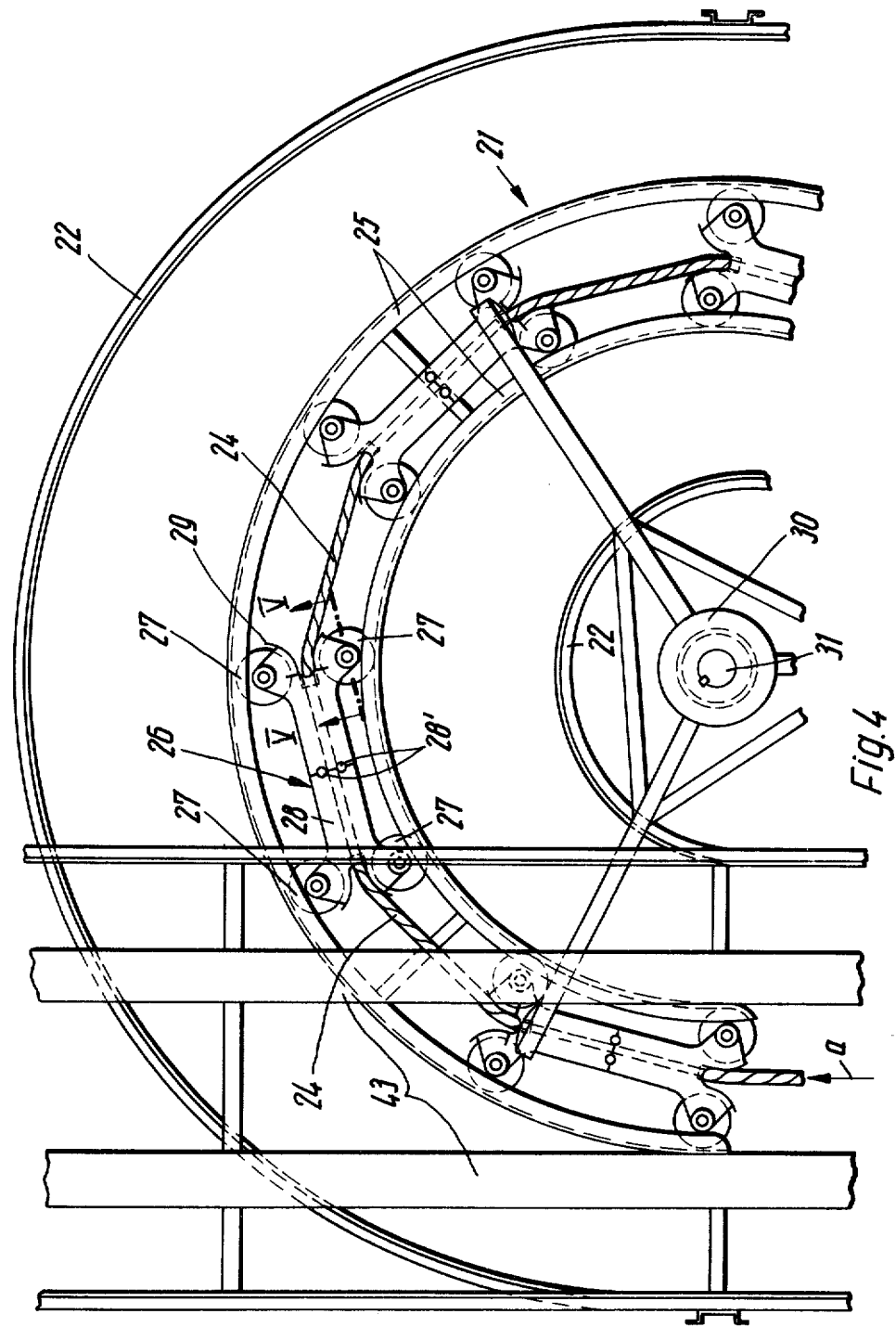
FIG. 4 is a partial plan view in the direction of the arrow IV shown in FIG. 3.
Figure 5:
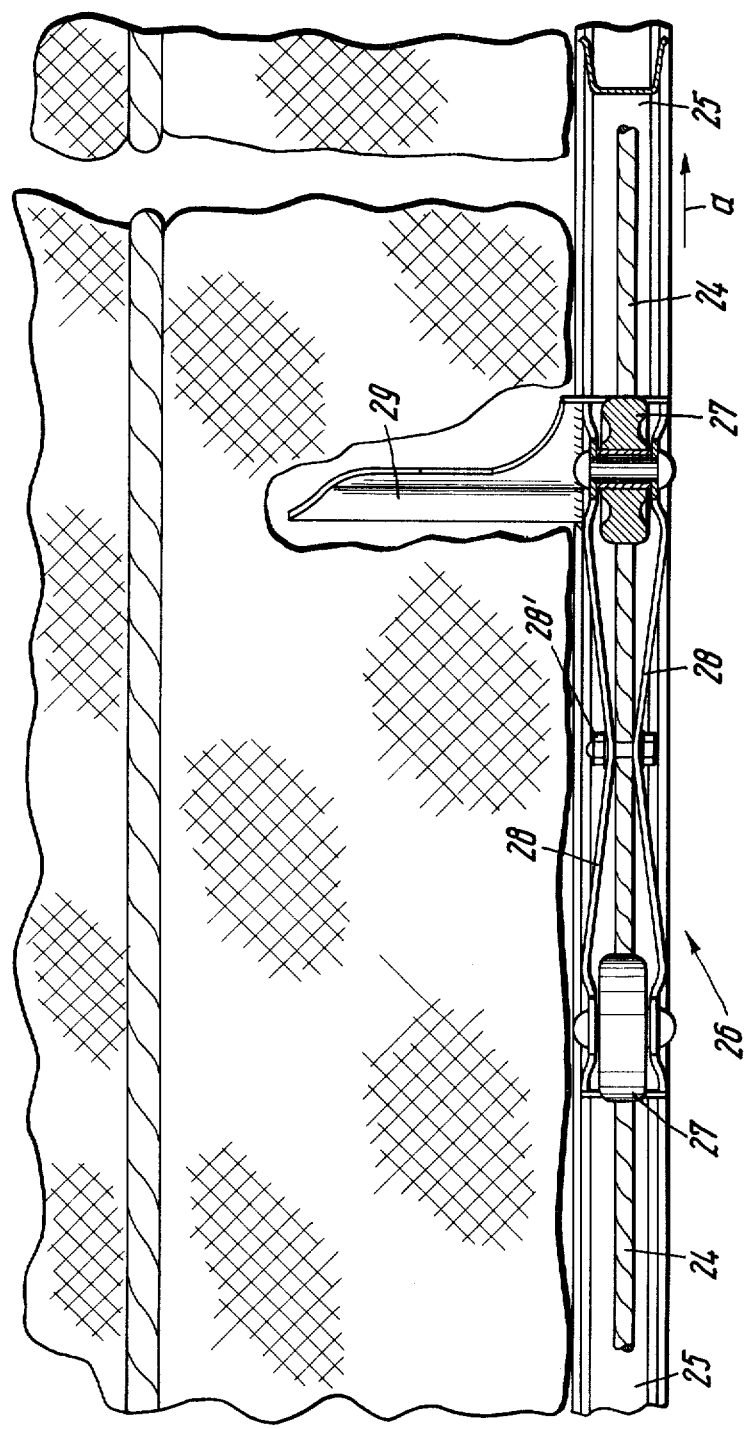
FIG. 5 is a side elevation of a vehicle in partial section on the line V—V of FIG. 4.
Figure 13:
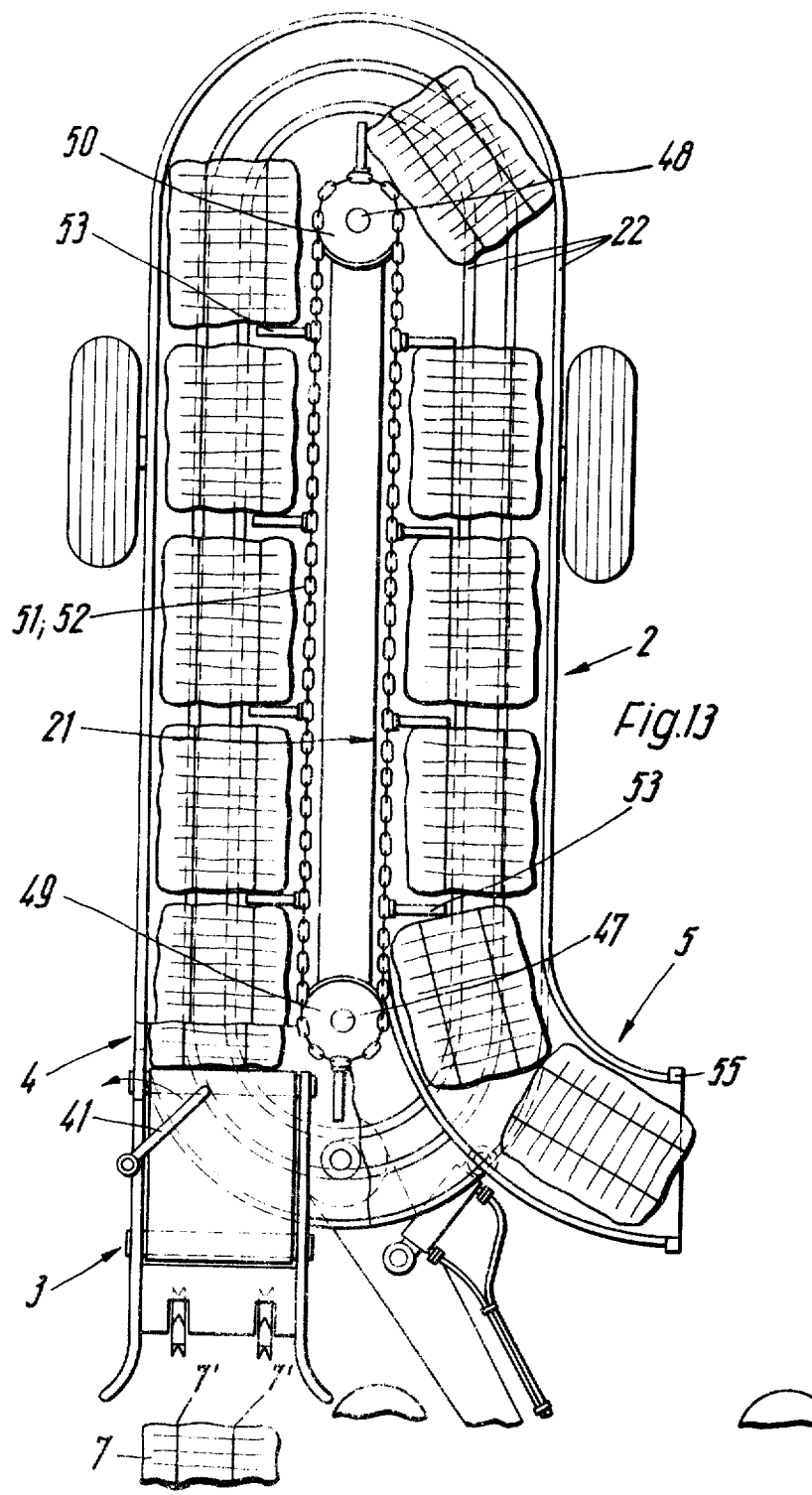
Figure 14:
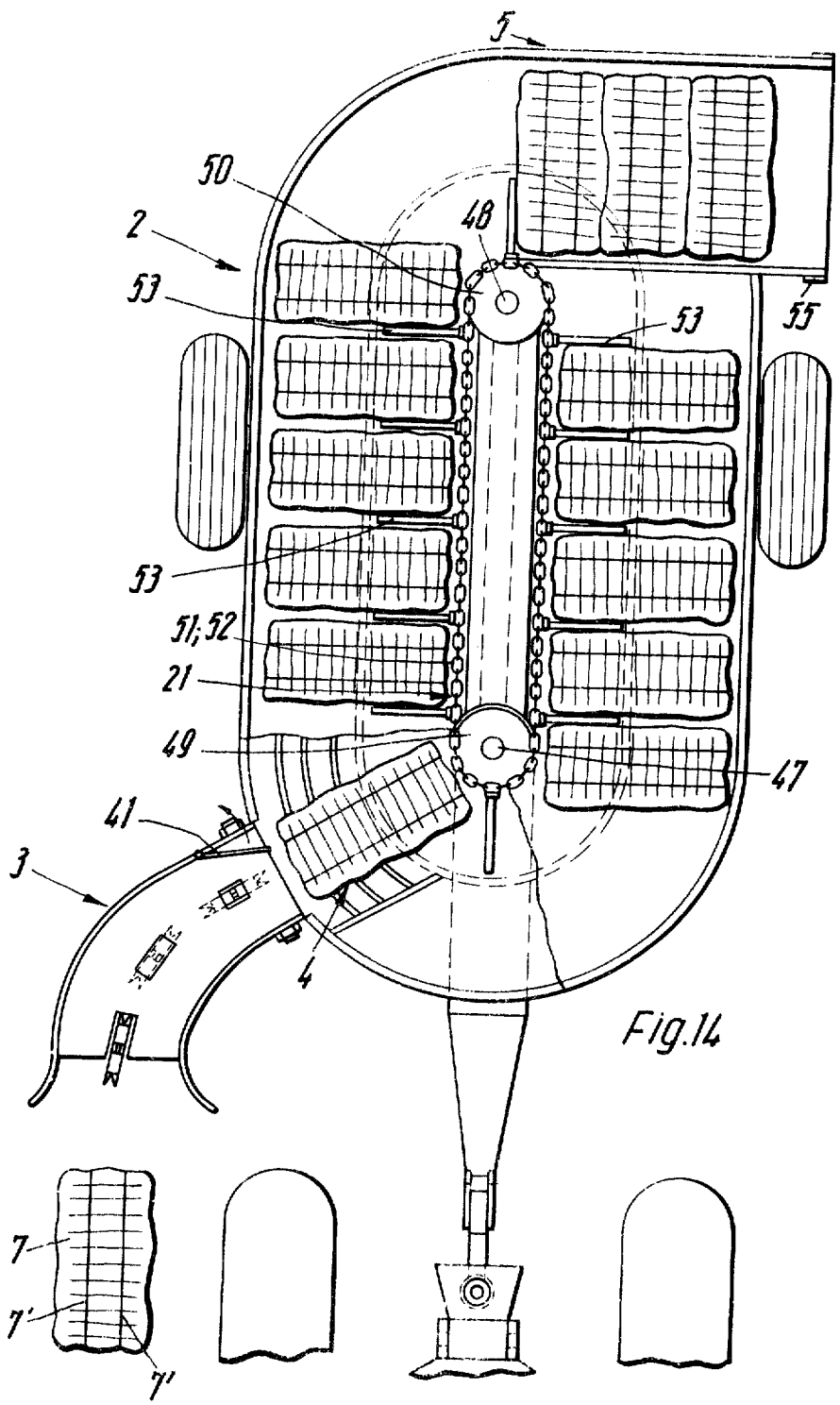
Figure 15:
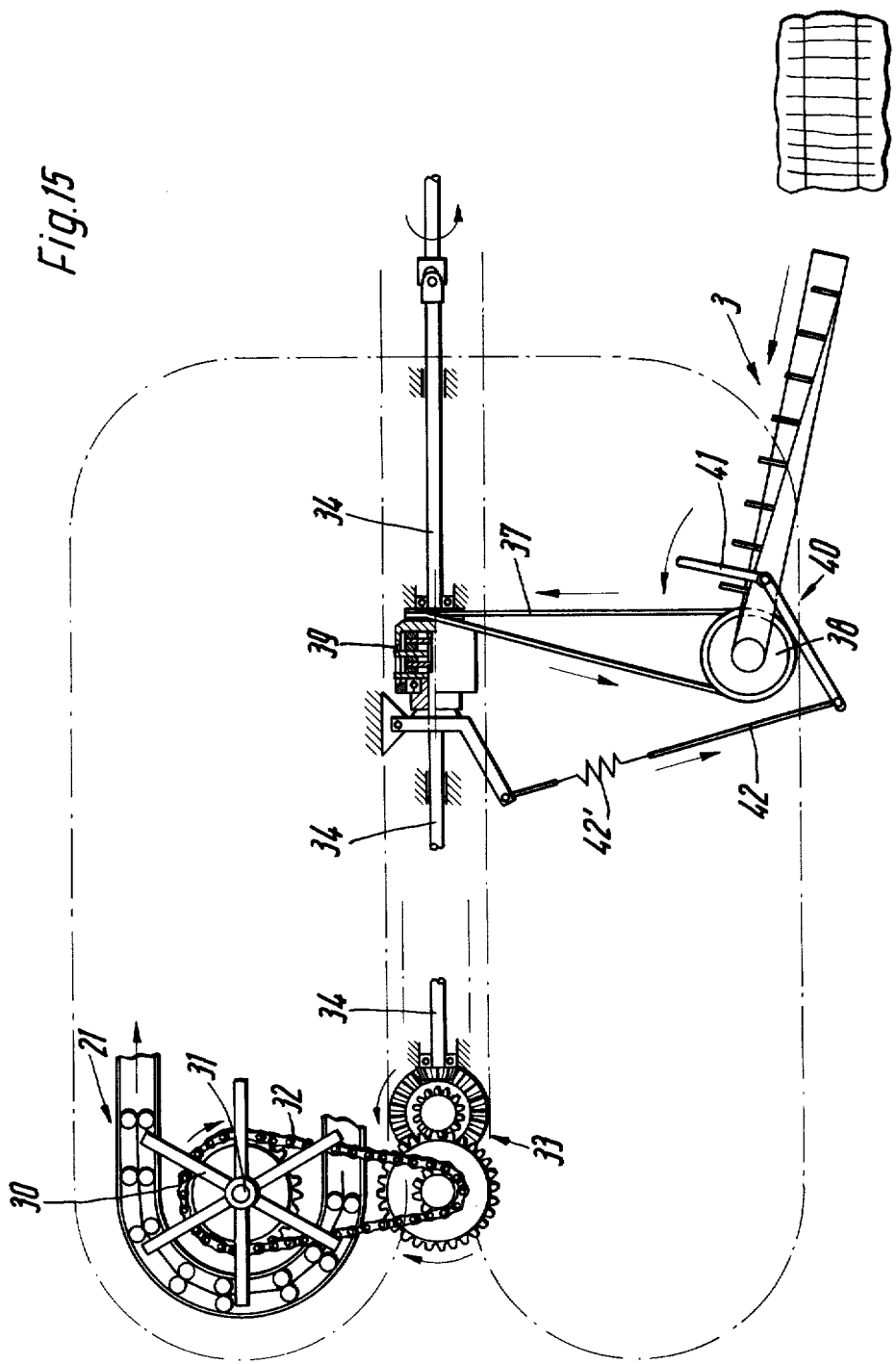
Figure 16:
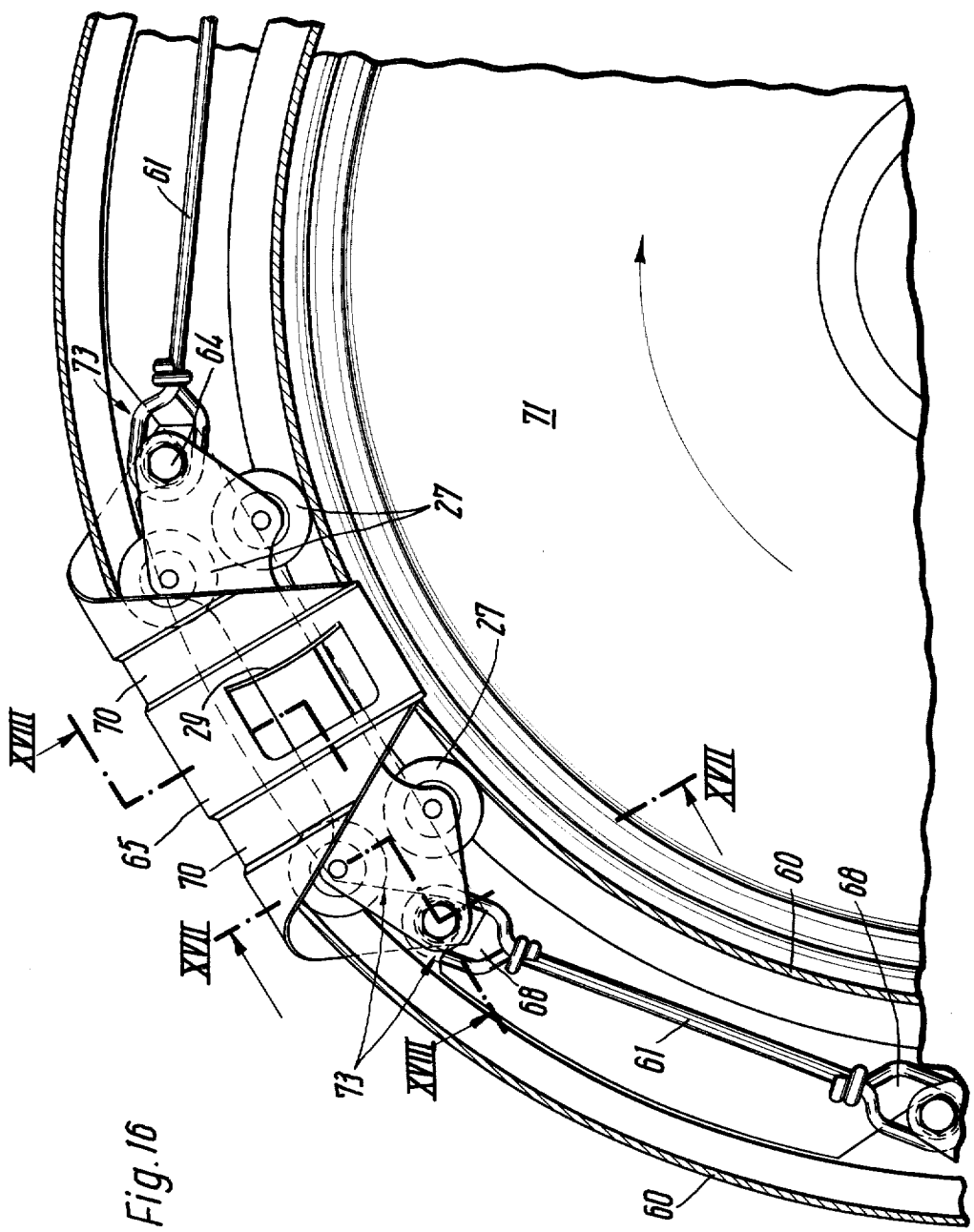
Figure 17:
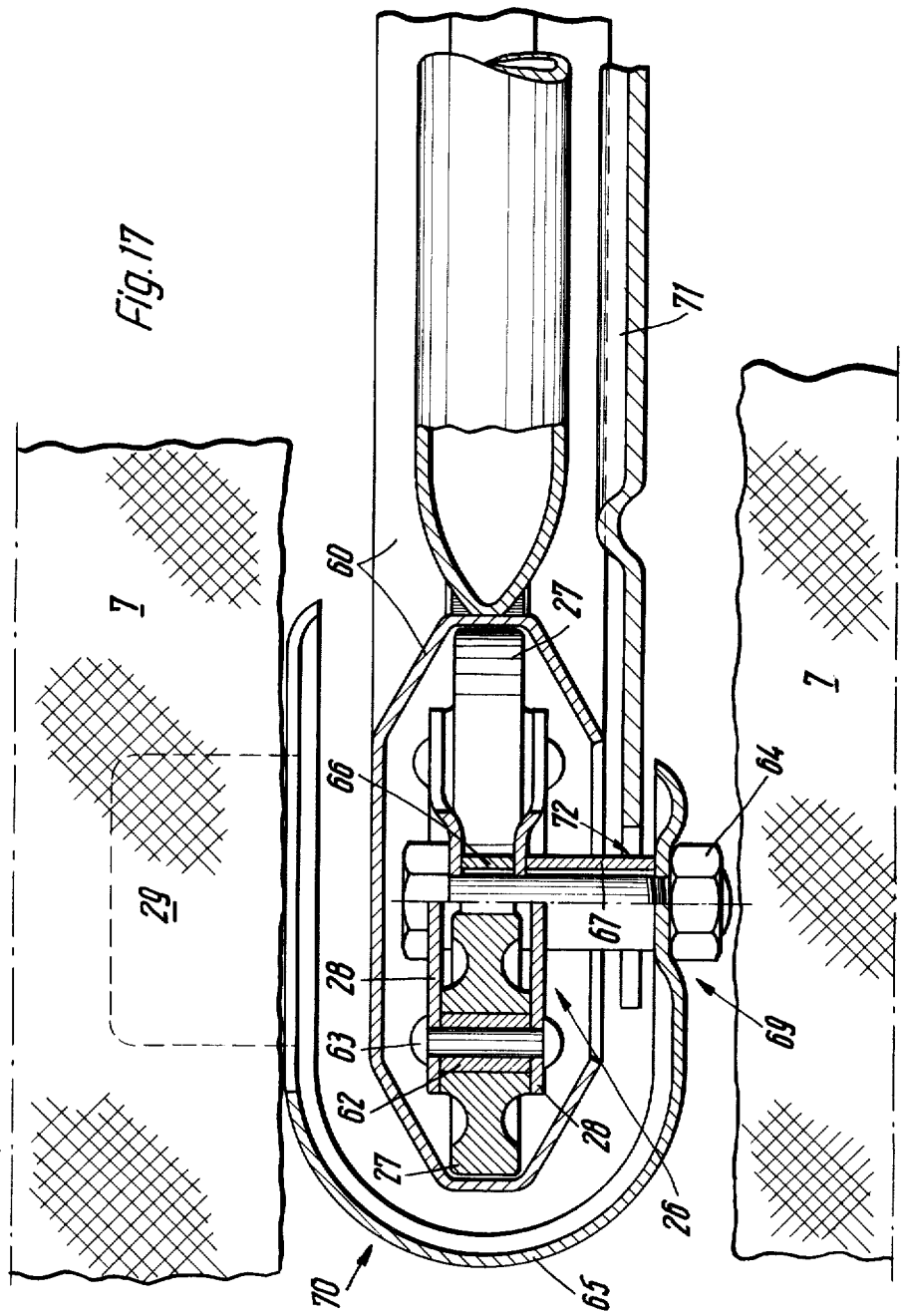
Figure 18:
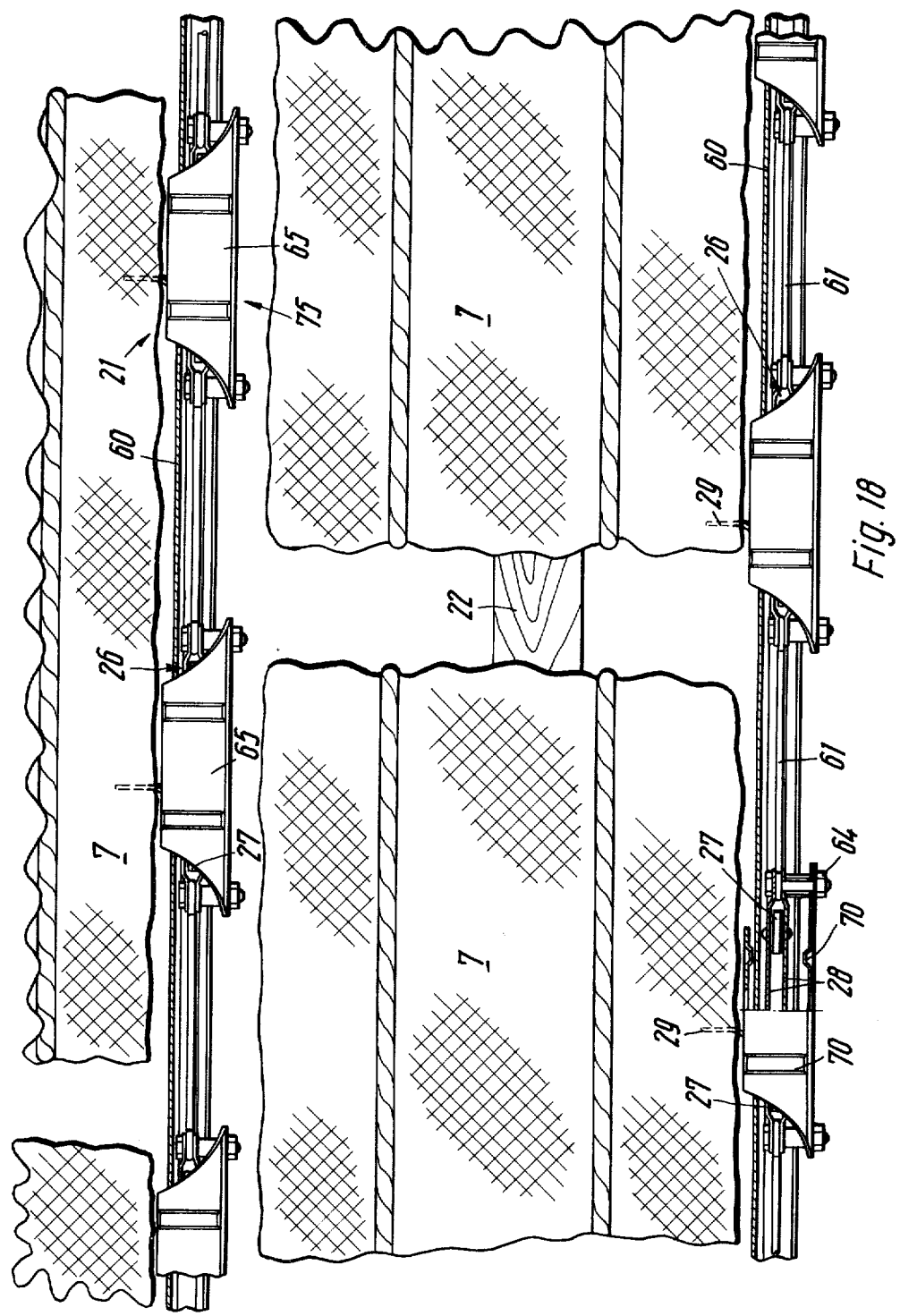
Figure 19:
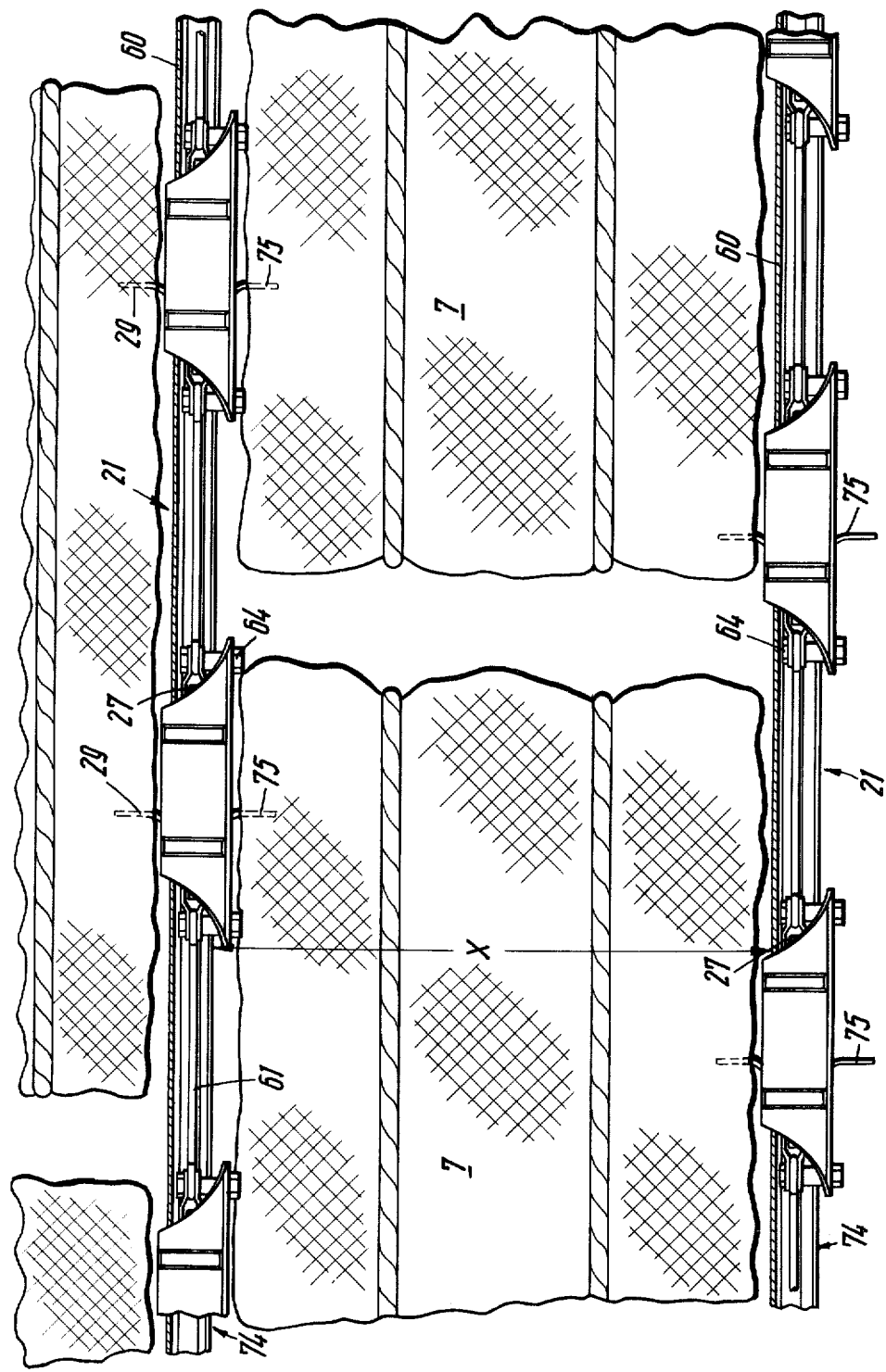
Figure 20:
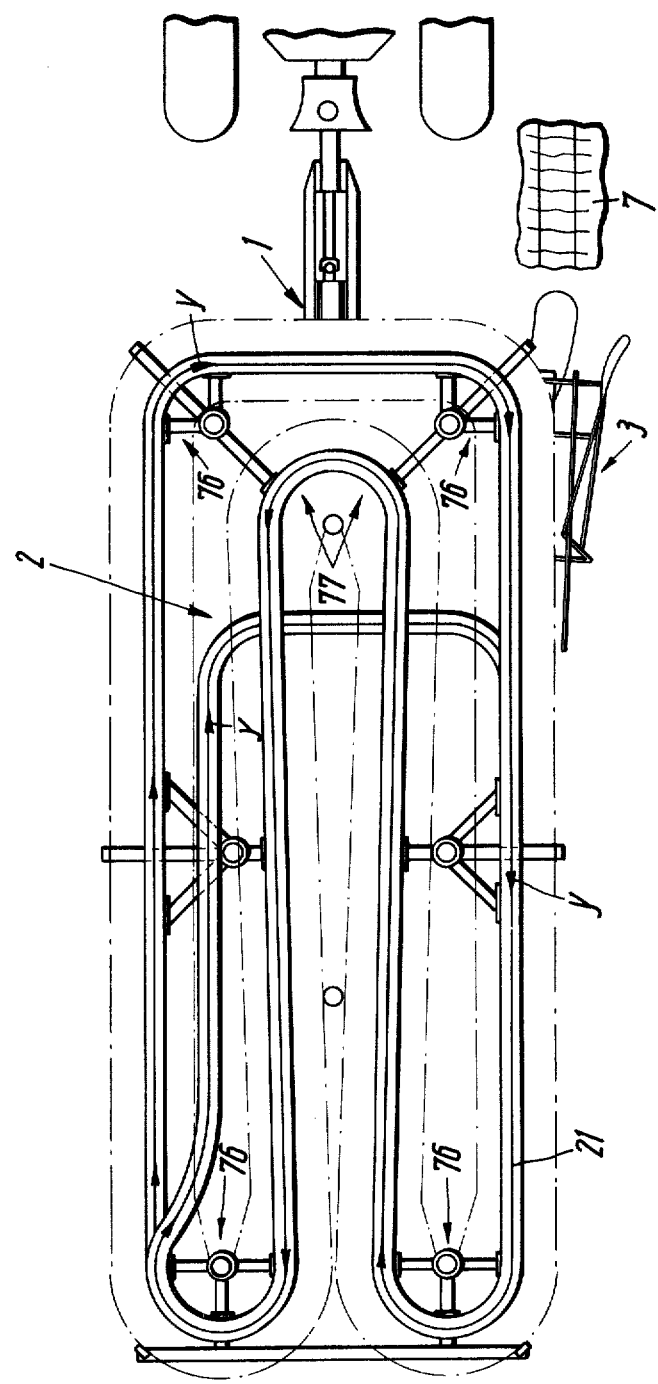
Figure 21:
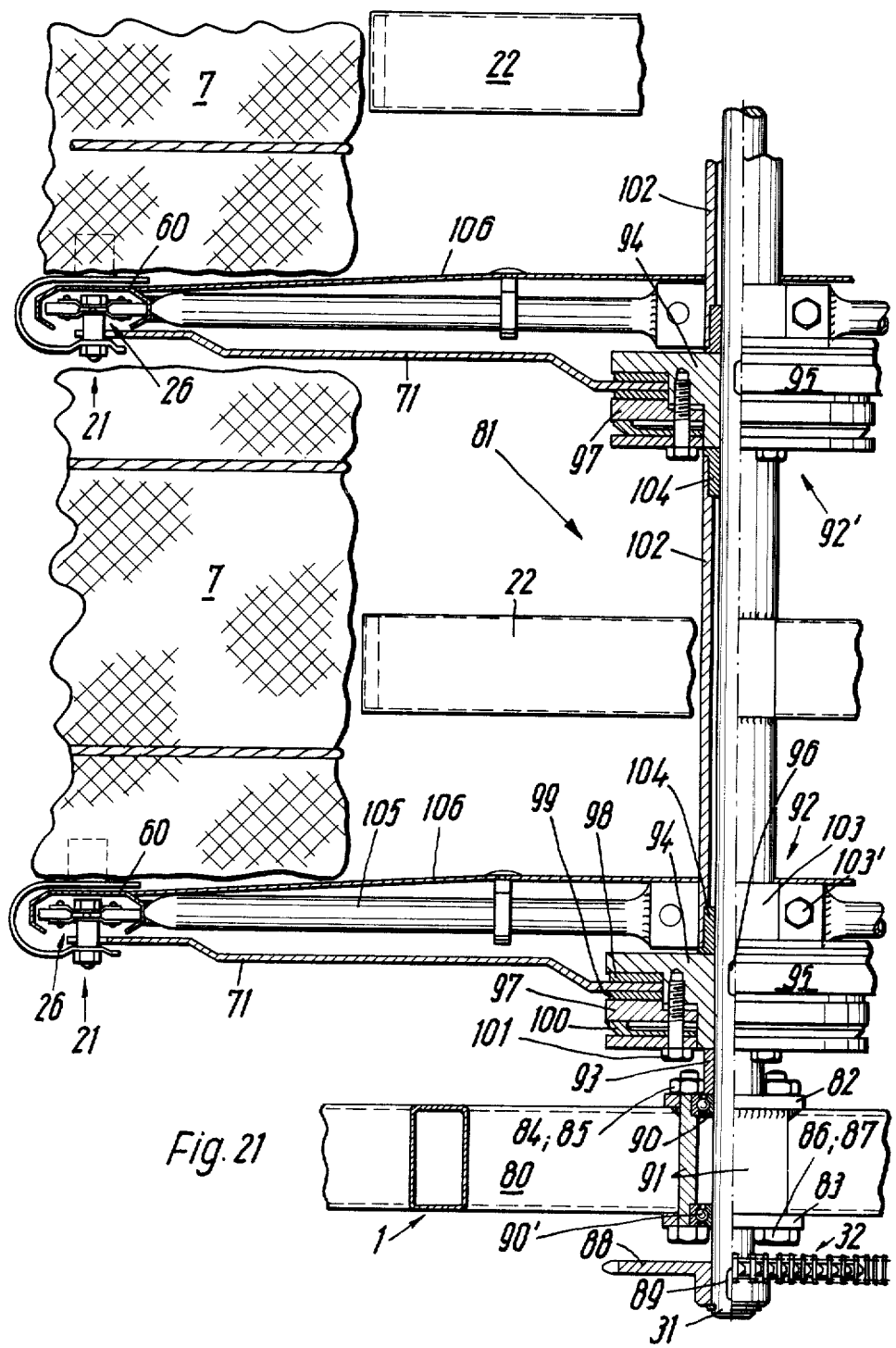

FIGS. 13 and 14 each illustrate a plan view of two additional embodiments of the invention;

FIG. 15 is a diagram of the drive arrangement;

FIG. 16 is a partial plan view like that of FIG. 4, this time however showing a modified embodiment, and partially in section;

FIG. 17 is a partially sectioned view on the line XVII-—XVII in FIG. 16;

FIG. 18 is a partially section side elevation on the line XVIII—XVIII of FIG. 16; similar to that of FIG. 5, but relating to the modified embodiment shown in FIGS. 16 and 17;

FIG. 19 is an elevation similar to that of FIG. 18, this time of a somewhat further modified embodiment;

FIG. 20 is a schematic plan view of the transport vehicle with an endless conveyor designed along the lines shown in FIGS. 16 to 19; and FIG. 21 is a half-section through a drive post with several drive arrangements for the endless conveyor, viewed in the direction of travel of the vehicle.

In the preferred embodiment of the agricultural transport vehicle in accordance with the invention, illustrated in FIGS. 1 to 5, the chassis frame 1 carries a conveyor magazine in the form of several horizontal levels with transitions between them, the magazine being designated in toto by 2 and forming the actual load space of the vehicle.

This conveyor magazine 2 forming the load space of the vehicle, receives the bales picked up from the ground by the pick-up mechanism (described in detail later and designated in toto by 3), at the forward, bottom end of the load space, at the point marked 4, and feeds the arriving bales successively (storing them at the same time) in the direction of the arrow through its different load sections until it is completely full and the first of the arriving bales reaches the discharge end, at 5, located at the top rear edge of the load space, i.e., the magazine is then completely full.

Figure 2:
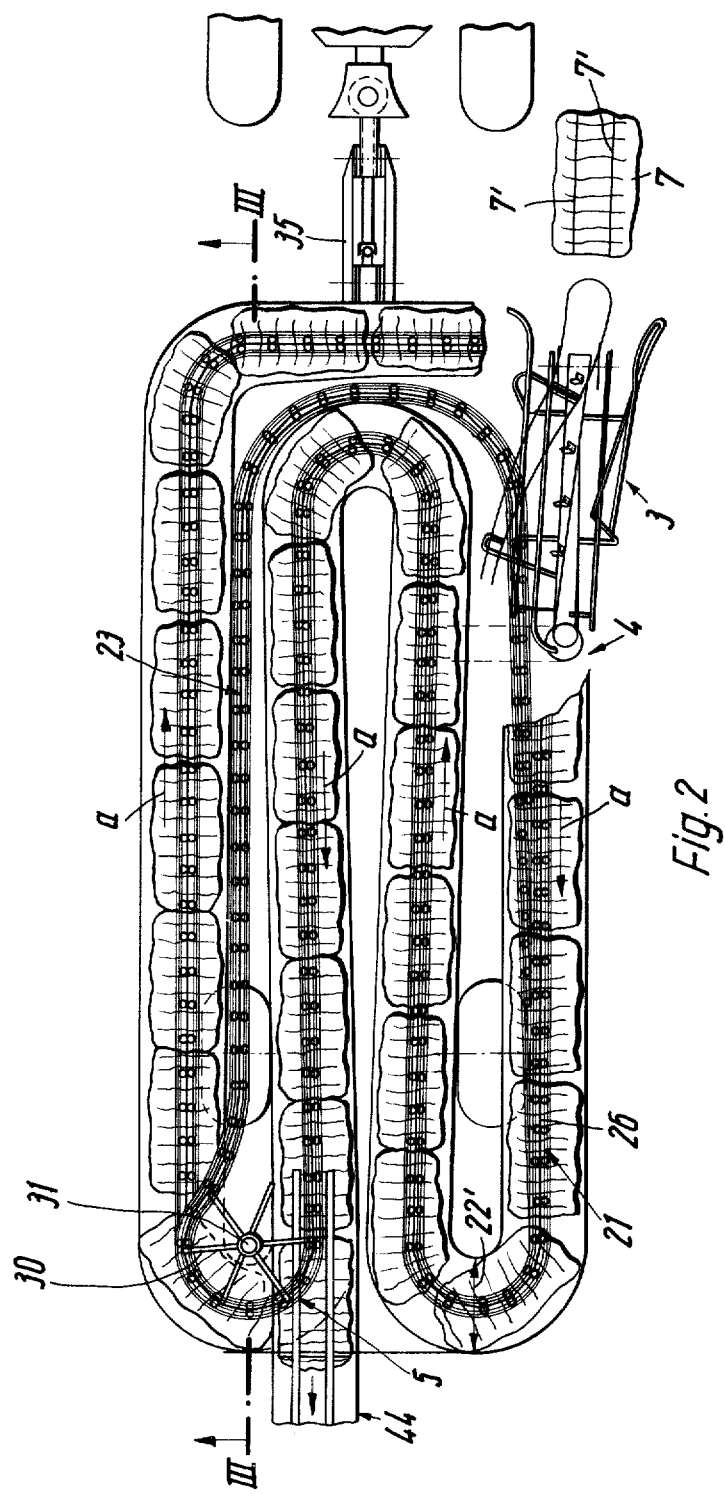
FIG. 2 is a planned view of FIG. 1.

The area traversed by the conveyor magazine 2 in each load section, as the plan view of FIG. 2 shows particularly well, covers a rectangle substantially circumscribed by the chassis frame 1. In this context in each of the several superimposed and joined load sections, the conveyor magazine follows a path which in each case substantially fills out and occupies this area. As FIG. 2 shows particularly well, the rectangular area in each case covered by the conveyor magazine in any level is traversed four times in a straight line longitudinally with a total of three 180° changes of direction, and once in a straight line transversely, with two 90° changes of direction, and considering for example the vehicle width prescribed by the German road traffic regulations, of 2.50 m, this makes it possible to achieve particularly efficient exploitation of the area with only a small number of changes of direction. The transition from one load section to the next, in the conveyor magazine, in each case takes place along a straight section and in fact along the longest straight section, as FIG. 3 shows particularly well, there the long, straight, sloping transition sections 6 being illustrated.

Figure 1:
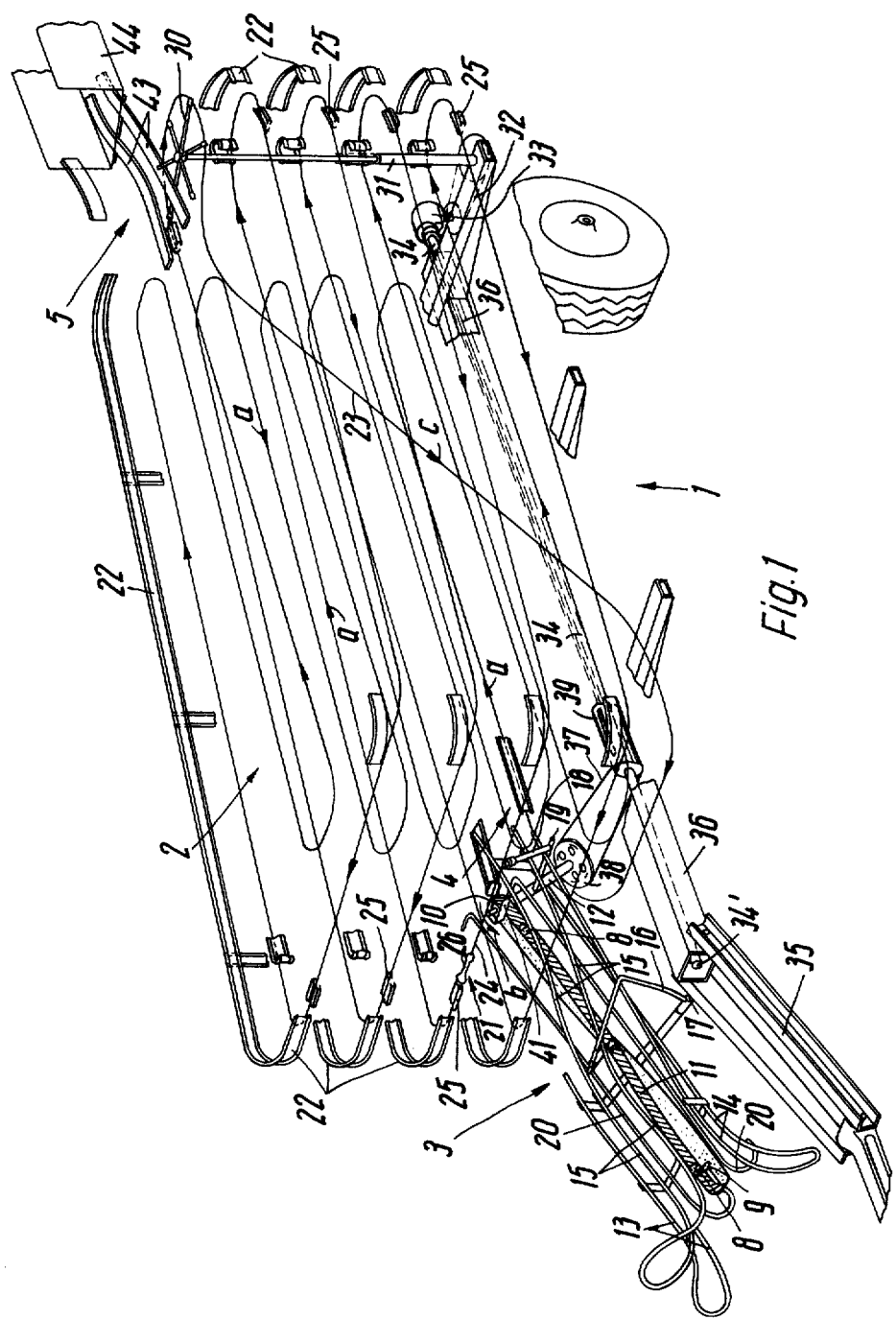
FIG. 1 is a perspective overall illustration of an agricultural transport vehicle in accordance with the invention, in a first, preferred embodiment.
Figure 3:
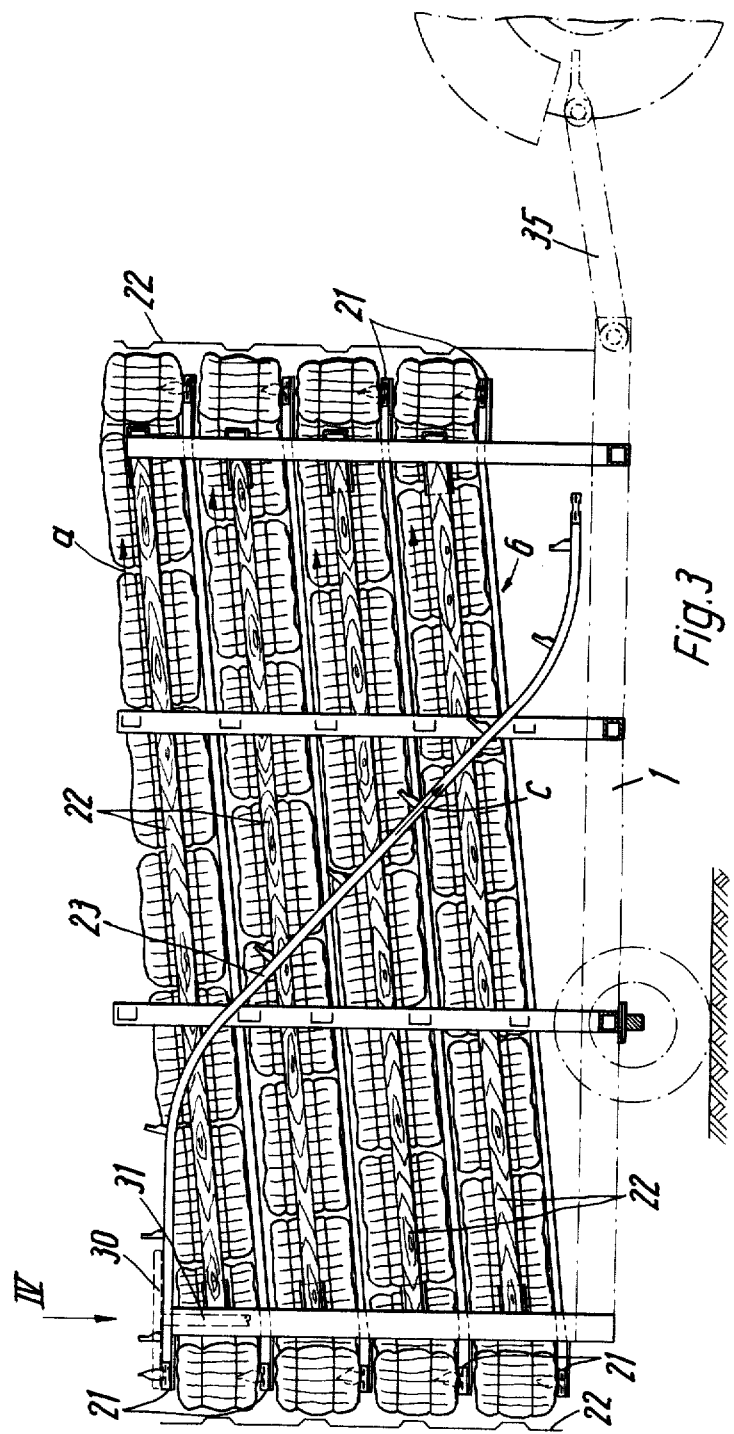
FIG. 3 is a section on the line III—III of FIG. 2.

As FIGS. 1 to 3 also show in detail, the bales (bales 7 in FIG. 2) lying in the field after deposition by a high-pressure baling press, are first of all picked up by the pick-up mechanism 3 and supplied to the conveyor magazine 2. The pick-up mechanism 3 advantageously consists of a conveyor belt 11 equipped with drivers 8 and extending obliquely downwards over rollers 9, 10 the belt being driven by its rear, upper roller 10 in the direction of the arrow b by a drive shaft 12. The rollers 9, 10 of the conveyor belt 11 have their axles arranged at 90° to one another so that the conveyor belt is twisted through a total of 90° over its length (FIG. 1). Laterally adjacent the conveyor belt 11, there extend lateral guides 13, 14 in the form of guide rails, or guide frames which flare towards the end nearer the ground, whilst at an interval above the conveyor belt 11 there is a frame-like retainer 15 which flares upwards towards the ground end which, towards the rear, upper end of the pick-up mechanism 3, is likewise twisted through 90° in the same way as the conveyor belt. The retainer 15 is carried by a first mounting 16 rotatable at 17 about one axis, and a second mounting 18, rotatable at 19 about a second axis, and can move upwards and downwards to a limited extent, preferably in spring loaded fashion depending upon the size of the bales being picked up. The lateral guides 13, 14, the retainer 15 and the guide bars 20 arranged at an interval deside the conveyor belt 11 form together with said belt a channel in the pick-up mechanism 3, in which channel the arriving bale is turned through 90° before it enters the conveyor magazine 2. This means that each bale (bales 7 in FIG. 2) deposited upon the field by a baling press, is rotated out of the illustrated, normal lying position, into a position in which the planes circumscribed by the planes of the binder twines 7' of the bale 7, are parallel to the conveyor plane of the magazine 2 so that each bale is after a manner of speaking supplied "on edge" to the conveyor magazine at 4, and passes through the magazine in this position as well. In this way, as FIG. 2 shows particularly well the desired path followed by the conveyor magazine in each plane is rendered possible at any rate made easier to achieve, within the limits of the prescribed vehicle width of 2.50 m, because in this fashion the bales occupy only a small amount of space within the available load space width.

The bales picked up and rotated by the pickup mechanism 23, enter the conveyor magazine 2 at 4, the magazine consisting primarily of an endless conveyor 21 for positive transportation of the bales and also exhibiting guide rails or walls 22 which, together with the conveyor 21, define a channel guiding the bales. This channel will conveniently widen in each case at the bends in the magazine, and in fact in the plane of the bends as visible at 22' in FIG. 2, so that the bales can move through the bends without experiencing any substantial resistance. The endless conveyor 21, driven by a drive system which has yet to be described, passes through the inter-connected horizontal load sections up to the top, rear discharge position 5, whence it is guided by a return path 23, passing obliquely downwards through the load space in the direction of the arrow c back to the entry position 4 of the conveyor magazine 2.

In the preferred embodiment illustrated in FIGS. 1 to 5, the endless conveyor 21 consists of carriages 26 articulated together, for example by means of a cable 24 and guided in rails 25 constituted by U-section profiled members open at the side (FIGS. 4 and 5). The carriages 26 each consist of a frame with four rollers 27, the frame being for example formed by two metal plates 28 bolted together centrally by means of bolts 28' or the like, the bolts also clamping it to the continuous, endless cable 24. Instead of being bolted to the continuous, endless cable 24, each carriage 26 could also be connected by sections of cable, attached to it, with the preceding and following carriages; again, direct articulating coupling between the carriages, e.g., through the medium of ball joints, is possible. The articulated connection of the individual carriages 26 by means of a continuous, endless cable, however, makes it impossible in a particularly simple fashion to achieve universally articulated connection between the carriages so that the negotiation of the bends and/or slopes in the rails 25, by the carriages, is achieved particularly simply without any risk of cross-binding or jamming.

A modified design of the carriages and rails of the endless conveyor, which has particular advantages in a variety of respect, will be explained in more detail later on making reference to FIGS. 16 to 20.

Each of the carriages 26 carries at least one bale driver 29, conveniently attached to its forward end, by means of which positive transport of each bale, on the endless conveyor 21 within the magazine 2, is ensured. The bale drivers 29 here also serve at the same time as drive elements for driving the endless conveyor 21. As FIG. 4 taken in conjunction with FIGS. 1 to 3, shows, in the embodiment concerned here the transmission arrangement for the endless conveyor 21, taking the form of a star wheel 30, is located at the discharge position 5 of the conveyor magazine 2, at the upper, rear edge of the load space. The conveyor 21 of the magazine consequently operates in traction throughout the entire conveyor length and only the empty return run 23 is slack. For drive purposes, a drive shaft 31 extending vertically up from the chassis frame 1, through the load space, and carried in suitable bearings, is provided, the shaft being equipped at its top end with the star wheel 30 for transmitting the drive to the endless conveyor 21, and at its bottom end being driven through a chain drive 32 preceded by a bevel gear system 33 or for that matter being driven directly through a gear box from a main drive shaft 34. The main drive shaft 34 passes through the chassis frame 1 from front to rear, e.g., within a hollow beam 36 extending back from the tow-bar 35, this hollow beam also carrying the shaft bearing. At the forward end of the hollow beam 36, where the tow-bar 35 is mounted, the main drive shaft 34 has the usual splined end 34' for connection with a universal shaft which is connected at the other end to the power take-off shaft of the tractor used to pull the vehicle.

A modified design of the drive system, which has particular advantages in a variety of senses, is explained hereinafter in the context of FIG. 21.

As FIGS. 1 and 15 also show particularly well, from the main drive shaft 34 first of all the drive for the conveyor belt 11 of the pick-up mechanism 3 is taken, e.g., through a belt drive system 37, the belt running around a pulley 38 fixed to the drive shaft, of the pick-up mechanism 3; the use of the belt drive 37 for the conveyor belt 11 has the advantage that the drive to said mechanism 3 has a built-in slipping clutch in effect which becomes operative should the mechanism jam, e.g., due to a bale cross-binding. If required, the transmission of the drive from the pulley 38 to the drive shaft 12 of the pick-up mechanism 3, can include a manually operable clutch or coupling in order during the unloading operation (to be described later) of the conveyor magazine 2, to be able to halt the pick-up mechanism.

Behind the position at which the drive for the pick-up mechanism 3 is taken from the main drive shaft 34, through a belt drive system 37 or in some other suitable fashion, there is a clutch 39 which is normally disengaged so that that part of the main drive shaft 34 located after the clutch 39, and therefore, also the vertical drive shaft 31 carrying the star wheel 30 for driving the endless conveyor 21, are stationary. At the top rear end of the pick-up mechanism 3, in fact where the picked up bale is already in its turned feed position, prior to entering the conveyor magazine 2, a shift/control device 40 for the clutch 39 of the main drive shaft 34, is arranged. This shift/control device 40 can be equipped with a probe 41 which projects into the path of movement of the bale in the pick-up mechanism 3, the probe being pivoted aside by the passing bale and thus engaging the clutch 39. The clutch 39 only remains engaged as long as the probe 41 is held out of the way by the passing bale, and as soon as the bale leaves the probe 41 the latter swings back into the path of movement followed by the bales, i.e., into the conveyor channel of the pick-up mechanism 3, this being produced for example by simple return springs, whereupon the clutch is disengaged again. In this fashion, the clutch 39 is controlled as a function of the length of the bale moving past the probe with the result that the drive for the endless conveyor 21, through that section of the main drive shaft 34 located after the clutch 39, the angle drive 33, the chain drive 32, the vertical drive shaft 31 and the star wheel 30 located at the top of the latter, is in each case only set in motion for a time corresponding with the length of the bale picked up by the pick-up mechanism 3, whereafter it stops again. In this manner, using a corresponding transmission ratio in the drive system, the endless conveyor 21 of the conveyor magazine 22 is contrived to advance, with each bale picked up, by a distance corresponding substantially to the length of the bale and thus in the conveyor magazine at least the amount of space required for the accommodation of the new bale is created. The bales already in position in the conveyor magazine, in so doing simultaneously advance a corresponding distance forward. Instead of the control arrangement described and illustrated, for the drive to the conveyor of the conveyor magazine, using the probe 41 in the pick-up mechanism 3 to mechanically (e.g., cable 42 with over-load spring 42') or also hydraulically operate the clutch 39, self-evidently any other suitable control arrangement can be provided, operating mechanically, hydraulically or for that matter electrically, in order to operate the clutch as a function of the length of the particular incoming bale so that the conveyor in the conveyor magazine is in each case successively advanced by a corresponding distance. The matching of the conveyor drive, i.e., of the distance which it travels during the time for which the clutch is engaged, is achieved by corresponding choice of the transmission ratio in the angle drive 33 arranged at the end of the main drive shaft 34 and/or in the chain drive system 32 for the vertical drive shaft 31 whose top end carries the star wheel 30. Thus, it is possible to arrange for the intervals at which the bales are located on the endless conveyor within the magazine, to be varied to accord with differing conditions. The more compactly the conveyor magazine is occupied by the bales, i.e., the closer (apart from a minimum interval required for the bales to negotiate the bends in the conveyor magazine thus avoiding jamming together) the travel of the conveyor approaches to the length of the bale each time it advances, then of course the better will be the utilization of the conveyor magazine and therefore the exploitation of the load space which it constitutes.

It is self-evident that in this fashion the conveyor magazine forming the load space of the vehicle will gradually become filled by the bales lifted by the pick-up mechanism as the vehicle travels over a field, until, ultimately, the first of the bales to be lifted will have reached the upper, rear discharged position in the conveyor magazine, meaning that the magazine which constitutes the load space of the vehicle is completely full of bales in the manner shown in FIGS. 2 and 3. In order to indicate to the tractor driver that the vehicle is full, conveniently, on the conveyor magazine and in the neighbourhood of the discharge location thereof, a probe or the like, (not shown) will be provided, by means of which, when the first loaded bale has reached the discharge position, an acoustic and/or optical signal is triggered warning the tractor driver, and/or the conveyor drive halted, e.g., by locking the clutch. The thus fully loaded vehicle is then driven by the tractor driver to the chosen unloading point, for example the thresher or a hay loft over the stalls (the drive to the pick-up mechanism being halted as a consequence of the halting of the tractor power take-off). On arrival at the unloading position, the conveyor of the conveyor magazine is started again, for example, after restarting the tractor power take-off, the main drive shaft clutch being shifted into permanent engagement by means of the shift/control device 40 (the simplest way of doing this for example being to lock the probe 41 into the pivoted position). The bales now exit successively from the discharge position of the conveyor magazine, in the order in which they were loaded. By installing a variable-speed drive, the unloading speed can also be increased.

To carry out unloading, at the discharge position 5, bale hoist rails 43 are arranged onto which the bales are slid (FIGS. 1 and 4) whilst at the same time being raised and disengaged from the drivers 29 on the carriages 26 of the endless conveyor 21, at the same time the bale drivers being released for engagement with the arms of the drive star wheel 30 so that they can be driven by same. At the discharge position 5 of the conveyor magazine 2, furthermore a chute 44 is provided which is advantageously pivotable about a horizontal and conveniently also a vertical axis, being furthermore telescopically extensible in longitudinal direction. This chute 44 picks up the bales arriving individually from the discharge position 5 of the conveyor magazine, 2, in sequence, the bales being moved forward over the chute, which can be equipped with a roller track 4, by the pressure of the bales further behind which are being fed forward by the conveyor of the magazine. Using the pivotable and possible extensible chute 44, and bales exiting from the conveyor magazine 2 of the vehicle can be unloaded individually and in a controlled way without requiring any manual intervention. Because the discharge end 5 of the conveyor magazine 2, provided in the embodiment of FIGS. 1 to 5, is located at the rear, upper edge of the load space at a normal load space height of around 3 m, and the extensible chute 44 is capable of introducing a further lift of up to about 4.5m, the bales can be conveyed from the vehicle directly, i.e., without using a special vertical bale hoist, onto the hay loft floor or the like which is normally situated within this height range. Self-evidently, it is also possible by means of the chute 44 to supply the bales arriving individually from the conveyor magazine, to a special bale conveyor device which then takes over the further transportation of the bales, since the chute can be pivoted both upwards and downwards. Directional adjustments are also possible, if the chute is furthermore capable of pivoting laterally about a vertical axis. After the individual bales have been unloaded, during this time it being ensured that thereis continuous positive engagement between each bale and the conveyor of the magazine so that the latter is in fact completely emptied, the vehicle is ready for another operation, i.e., for renewed pick-up and loading or storage of bales in the manner hereinbefore described.

To complete the description it ought also to be mentioned that the conveyor 21 of the conveyor magazine 2 slopes upwards in the area of its entry and pick-up position 4 in such a way that the bale drivers 29 penetrate from beneath into the bales in each case coming from the pick-up mechanism 3 and by means of the guide rails or walls 22 provided, laterally delimiting the channel of the conveyor magazine 2, and the rails 25 which delimit the conveyor channel at the top, and serve for the carriages 26 of the conveyor 21, the bales are provided with a corresponding abutment so that they cannot escape but are forced into engagement with the bale drivers 29 on each carriage 26 of the endless conveyor. Each bale remains in this engaged position (e.g., FIG. 5) throughout the remainder of its entire travel through the conveyor magazine 2 up to the discharge position 5.

Figure 6:
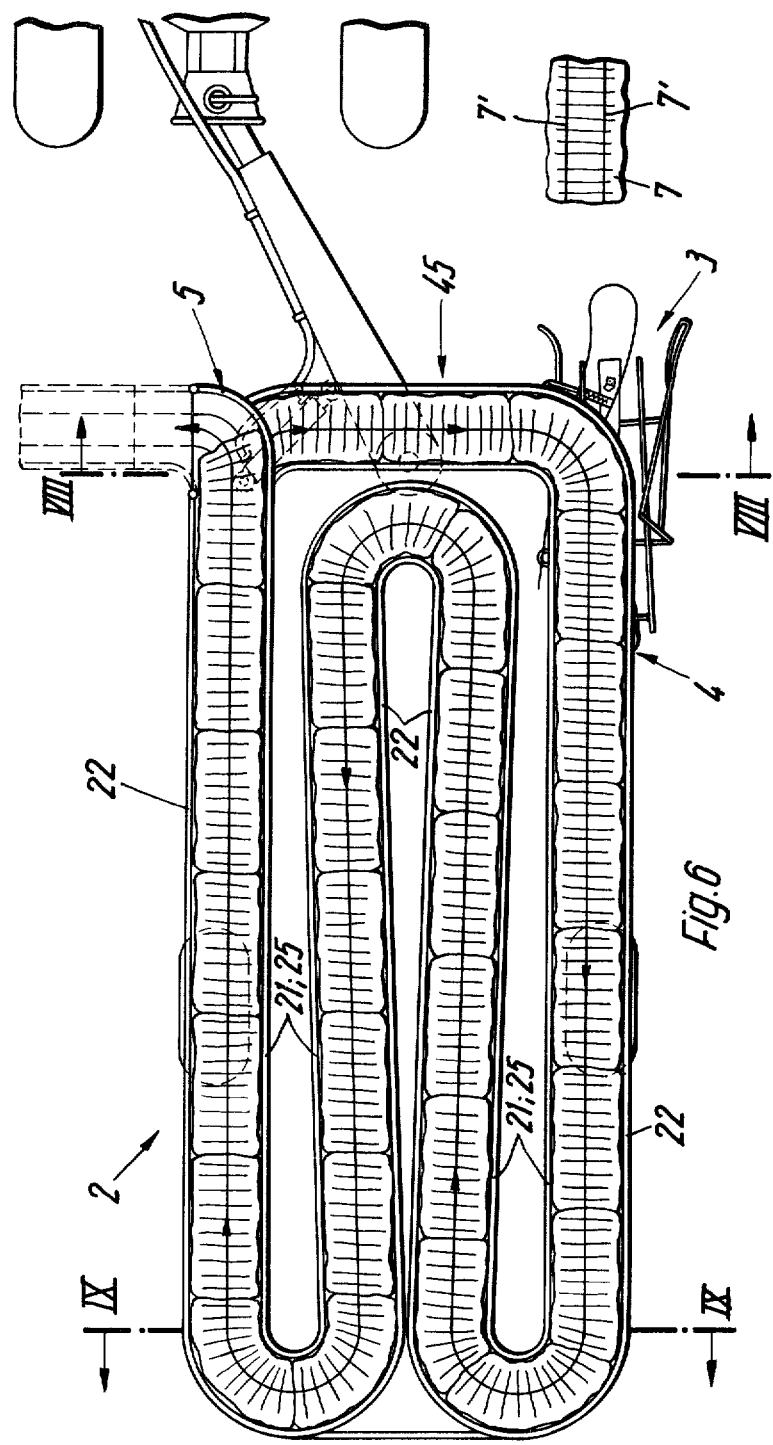
FIG. 6 is a plan view of the kind shown in FIG. 2, but this time of a second embodiment of the invention.
Figure 7:
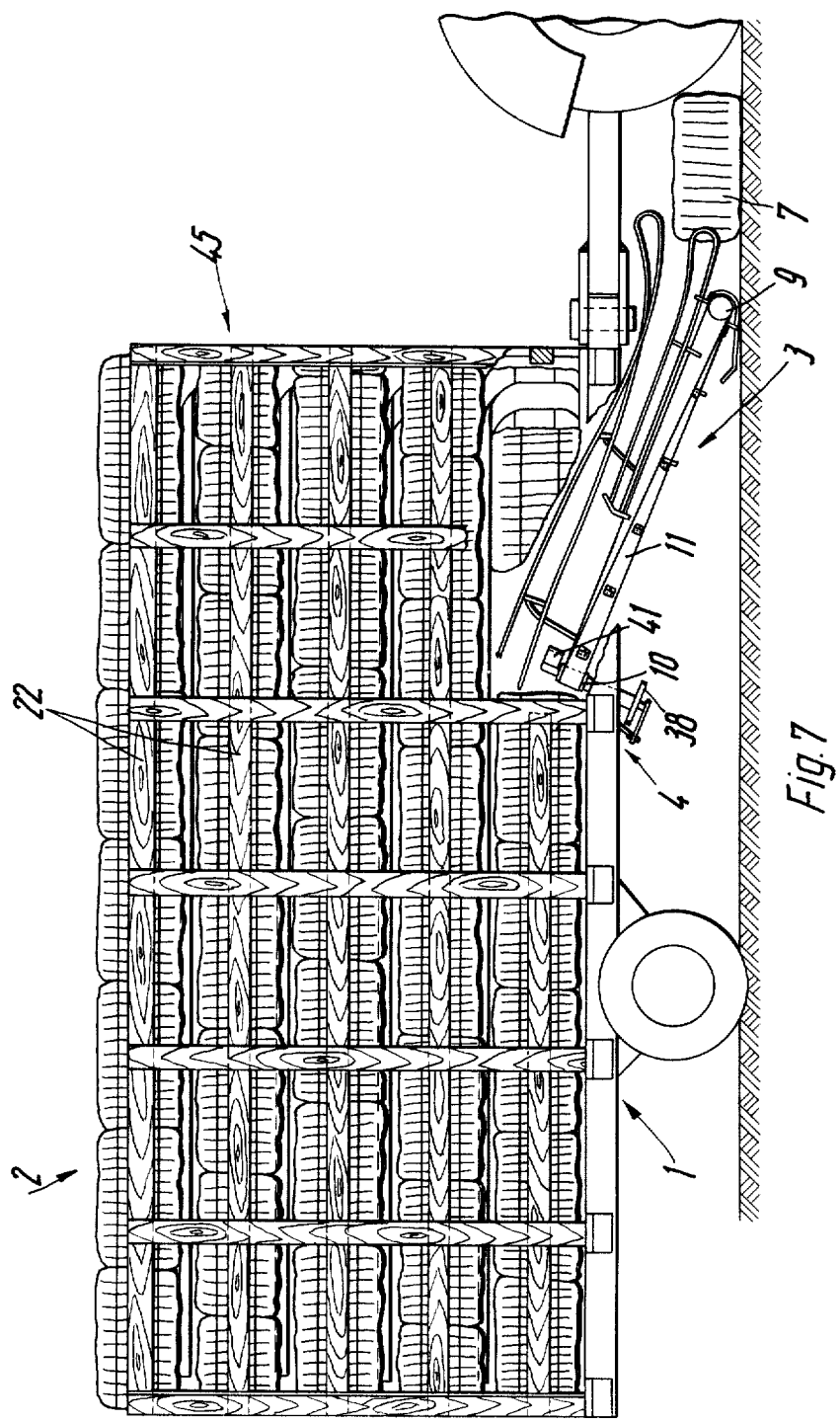
FIG. 7 is a side elevation of FIG. 6.

The second embodiment of the transport vehicle in accordance with the invention illustrated in FIGS. 6 to 9, in which components which are identical to those already described or have the same function, are given the same references as before, is distinguished from the preceding one of FIGS. 1 to 5, primarily by the fact that the endless conveyor 21 passes through load sections of the load space which extend vertically side by side. The bale drivers 29 on the individual carriages 26 of the endless conveyor 21, the latter otherwise not differing from the embodiments shown in FIGS. 1 to 5, thus do not engage from beneath, but instead from the side and in fact penetrate between the bales which for the rest are guided by the guide rails or walls 22, i.e., the drivers in fact displace the bales before them (FIGS. 8 and 9). The bales are thus made to slide, by drivers engaging from the side, up and on the guide rails or walls 22 and rails or walls 22 and rails 25 located in the particular horizontal conveyor plane, and thus pass through the conveyor magazine 2 fromthe entry or pick-up position 4 to the discharge position 5. As FIG. 6 shows, in this case the discharge position 5, although likewise located at the top edge of the load space, is not at the rear end, but at the front end where the pick-up mechanism 3 is also disposed, the discharge direction being sideways, i.e., at right-angles to the fore and aft axis of the vehicle, so that the bales individually discharged from the conveyor magazine 2 can be unloaded in a controlled fashion at the side of the vehicle, again by means of the chute 44, which is provided in this embodiment as well. A further distinction between this embodiment and the one illustrated in FIGS. 1 to 5, resides in the fact that the transitional path of the conveyor from one load section to the next, are in each case provided in the area of a short straight section mainly at the forward end of the load space, at 45, (FIG. 8); the advantage of this is that the long, straight sections of the conveyor magazine 2 are parallel to one another so that the dead space made necessary by the slopes in the zone of transition from one level to another, is smaller in relation to the horizontal arrangement, i.e., overall, for an otherwise identical arrangement of the conveyor magazine, a few more bales can be accommodated within the same base area.

The third embodiment of an agricultural transport vehicle, illustrated in FIGS. 10 to 12, where once again the same references have been used for the same components or ones having the same functions, is distinguished from the embodiments described hereinbefore in relation to FIGS. 1 to 5, and 6 to 9, primarily by the fact that the conveyor planes (load sections) of the load space, this likewise being arranged in several levels with junctions between them, are disposed perpendicularly to the chassis frame 1. This kind of arrangement of the inter-connected sections of the load space, in a perpendicular attitude one beside the other, without any other change to the already described convoluted path of the conveyor within each plane, can be of advantage when the required path of the conveyor cannot be achieved within the legally permitted width of the vehicle. In the vertical arrangement of FIGS. 10 to 12, the conveyor planes of FIGS. 6 to 9 merely have been rotated out of the horizontal attitude shown there, through 90° into the vertical attitude. Thus the limited space available width-wise for each conveyor plane, is instead replaced by a relatively unconstrained dimension extending in the upward direction. An advantage of this design furthermore, is the fact that the bales 7 lifted by the pick-up mechanism do not need to be rotated, but can be supplied to the conveyor magazine in the attitude in which they are laid down on the field, and then pass through the magazine in this attitude. Accordingly, by way of pick-up mechanism 3 a simple conventional mechanism can be used in this case.

For the rest, the embodiment of FIGS. 10 to 12 corresponds to the aforesaid described embodiments in terms of its mode of operation and design, and it goes without saying that in this case the drive shaft 31 with the star wheel 30 for driving the endless conveyor of the magazine 2 must be horizontally located but otherwise works in the same manner as before. The lifting of the bales by the pick-up mechanism 3 and their supply at 3 to the conveyor magazine, 2, again takes place at the bottom, forward end of the load space whilst the discharge end 5 for the bales is in this case located at the rear of the load space at a little over half the height thereof. The respective transitions of the conveyor magazine from one load section to the next, again takes place along a short straight section at 46 in the neighbourhood of the forward end of the load space (FIG. 11) so that here again, just as in FIGS. 6 to 9, the long, straight sections of the magazine contain no slope.

In FIG. 13 an embodiment is illustrated in which the load space defined by the conveyor magazine once again incorporates several joining load sections or conveyor levels in a horizontal direction. The convoluted path of the conveyor this time takes the form of elongated oval spiral path with a continuous low slope. The conveyor consists of a spiral guide or slide 22 for the bales winding upwards towards the top limit of the load space. The guide 22 is disposed around an endless bale-driving mechanism 21. This design can be employed, for example, where the bales arriving from the baling press are oversize so that at each bend relatively large radii of curvatures are required and/or where the vehicle, for one reason or another, has to be kept particularly narrow, i.e., its width is less than the prescribed width of 2.50 m. It goes without saying that in this case the loading capacity of the conveyor magazine 2 forming the load space, is smaller for approximately the same loading space height than in the embodiment hereinbefore described, but cases are conceivable in which, in the face of the facility which is created for taking oversize bales, the loading capacity is not so important. Also, in this case no rotating of the bales arriving from the pick-up mechanism 3 is required, because the radius of curvature can be kept sufficiently large and the conveyor 21, as explained hereinafter, does not pass through the conveyor levels.

The bale-driving mechanism comprises two or more endless chains passing around two shafts 47, 48 extending vertically downwards through the load space formed by the conveyor magazine. The chains are arranged in spaced horizontal planes and pass around the sprocket wheels 49, 50 carried upon the two shafts 47, 48. By way of drivers for the bales, plates 53 are provided extending between the chains 51, 52 vertically downwards, and attached to the chains, upon which the respective bales, on passage through the conveyor magazine are slid upwards vertically on the conveyor levels or planes constituted by the guide rails 22 and interconnected with each other, until they ultimately disengage from the drivers in the neighbourhood of the discharge location 5. This driving of the bales by respective driver plates 53, on their entire travel through the conveyor magazine 2, with simultaneous displacement of the bale in an upward direction on the driver plate, is achieved by virtue of the fact that the guide rails 22 upon which the bales advance are in each case located laterally at an interval outside the path taken by the driver plates 53.

For the rest, this embodiment corresponds in fundamental mode of operation and design, to the embodiments described hereinbefore, the picking up of the bales and their transfer to the conveyor magazine 2, being carried out by means of the pick-up mechanism 3, without any rotation, at the front, bottom end of the load space, whilst the discharge position 5 for the bales, as in the case of FIGS. 6 to 9, can be arranged at the forward end of the load space (constituted by the conveyor magazine), at one side thereof.

The final embodiment illustrated in FIG. 14, largely corresponds with the design described previously in relation to the FIGS. 13, in particular as far as the construction of the bale-driving mechanism is concerned, this again consisting of two or more conveyor chains, 51, 52 passing around sprocket wheels 49, 50 on vertical shafts 47, 48, with driver plates 53 extending over the full height of the load space vertically upwards between the conveyor chains. In this case, once again, several levels of the conveyor magazine 2 are provided which are disposed horizontally one above the other and merge continuously together, each spiral formation having a plan oval configuration albeit of shorter longitudinal extent, the overall vehicle being relatively compact in form.

The pick-up mechanism 3 although also located at the bottom edge of the load space constituted by the conveyor magazine 2, is in this case set back further to the side and, as FIG. 14 shows, is curved, commencing from its forward-pointing (in the direction of travel) pick-up end, towards the rearward discharge end, located at the conveyor magazine, in an arcuate fashion. The bales lying on the field are in this case, as also in the embodiment of FIG. 13, not turned in the pick-up mechanism itself, but pass instead into the conveyor magazine in the attitude which they have when lying on the field. Because of the curvature of the pick-up mechanism as provided in the embodiment shown in FIG. 14, and because its discharge position is offset towards the side of the load space, the bales however pass in a radial position, relatively to the forward curvature of the conveyor magazine 2, at the point 4 onto the guide rails 22 of the magazine, with the result that in this case (in contrast to all the other embodiments thus far described), the bales pass transversely through the conveyor magazine. In this fashion, particularly good exploitation of the load space, which by the very nature of the base area is relatively short and also narrow, is achieved, as the number of bales accommodated in a conveyor spiral or level of the magazine (this the drawing shows clearly), readily demonstrates.

The discharge end 5 of the conveyor magazine 2 is located in this embodiment once again, at the top rear edge of the load space constituted by the conveyor magazine, but is directed towards the side.

Both in the embodiment of FIG. 13 and in that of FIG. 14, self-evidently, the chute 44 referred to earlier in respect of the other embodiments, is employed, in these latter two cases it being necessary to imagine the chute as arranged at 55, pivotable about a horizontal axis so that controlled unloading either in an upward or downward direction is made possible in this case too. It should also be pointed out that in the last-mentioned two embodiments, of FIGS. 13 to 14, the drive to the bales is effected in fundamentally the same fashion as described above via-a-vis the other embodiments and as illustrated in principle in FIG. 15, the control of the drive again being achieved as a function of the length of the bale picked up by the pick-up mechanism, with the help of the probe, 41 which is provided in this case also. The drive transmission ratio must be so contrived in this context that during the time of engagement of the clutch 39 the chain 51, 52, in each case advances by the length of a chamber defined by the driver plates 53. Because in neither of these cases, however, do the chains 51, 52, have a return, idle run, instead both runs being used to advance the bales, it is fundamentally immaterial here whether the front or rear one of the vertical shafts 47, 48 actually does duty as the drive shaft. The driven shaft 47 or 48 as the case may be, can be driven directly by the part of the main drive shaft 34 that is located after the clutch 39, through the agency of the angle drive arrangement 33, whilst the other drive sections (star wheel 30 with shaft 31 and chain drive 32), are not provided here.

In FIGS. 16 to 20, an embodiment which has been modified primarily in terms of the carriages and rails of the endless conveyor 21, has been illustrated, the embodiment chosen for illustration being the one depicted earlier in FIGS. 1 to 5. As FIG. 20 first of all shows, the transport vehicle again in the form of a single-axle vehicle, consists of the chassis frame 1 upon which the conveyor magazine 2 is installed in several levels. The conveyor magazine 2 is traversed by the endless conveyor 21 which, here, as FIGS. 16 and 17 show particularly well, simply exhibits one rail 60, corresponding to the conveyor length and open solely in the downward direction. In the rail 60, the carriages 26, in this case interconnected by links 61 and forming the major part of the endless conveyor 21 are located. The carriages 26 here, once again, preferably consist of two shaped plates 28 which are supported in the rails 60 by the four rollers 27. The rollers 27 run with a certain clearance on spacer bushes 62 which in turn hold the two plates 28 together by means of rivets 63, screws or the like. At the ends, the plates 28 contain a punched hole through which a screw 64 is passed. Between the two plates 28 and the bottom plate 28, and an extension 65, the screw 64 carries respective spacer bushes 66 and 67. Prior to the insertion of the screw 64, the spacer bush 66 is passed through an eye 68 in the link 61 and inserted between the two plates 28. By tightening down the screws 64, in this fashion a fixed connection between the carriage 26 and the extension 65 is produced. The extension 65 conveniently made of sheet metal, is sickle shaped, as FIG. 17 shows particularly well, and embraces the rail 60, from the point of attachment 69 to the carriage 26, with a certain clearance. From a production point of view, the extension 65 is a triangular or trapezoidal punching and is stiffened by pressed creases 70. Above the rails, 60, the extension 65 carries the acutal bale driver 29 which can likewise be formed integrally with the extension 65. Preferentially, the bale driver 29 will also contain a crease or be strengthened by a gusset.

Because the extension 65 provided on each carriage 26 embraces the rail 60 from below, the result is achieved that the rail 60 can be closed at top and sides. Consequently, foreign bodies such as hanks of straw, pieces of bales or the like, cannot clog the rollers 27.

Transmission of the drive here again, as FIGS. 16 and 17 show, is effected from the drive wheel 71, to the endless conveyor 21, beneath the rails 60. The drive wheel 71, as FIG. 17 shows particularly well, engages in a gap 72 between the rails 60 and the extension 65 and drives the carriage 26 by the thrust which it applies to the spacer bushes 67 at both sides of the carriage. The recess 73 in the drive wheel 71 is so chosen that said wheel can engage like the sprocket wheel of a roller chain, with the endless conveyor 21.

As FIG. 19 also shows, particularly well, in this embodiment the interval X between the levels 74 of the conveyor magazine 2, one above the other, can be so chosen that a specific bale size is in each case accommodated between part of the endless conveyor 21 in lower and upper levels 74. The lateral guides 22 shown in FIG. 18 for the pressed bales 7, can then be dispensed with altogether. It is advantageous in this context, however, also to provide a bale driver 75 on the bottom part of the extension 65. The bales, in this embodiment, are simply clamped between the individual levels 74 of the endless conveyor 21, and conveyed onwards in this manner.

The disposition of rails 60 which are closed at top and sides, in a conveyor magazine 2, with carriages 6 which have laterally embracing extensions 65, requires that said rails 60, viewed in the direction of transportation of the endless conveyor 21, are always free at the same side. As FIG. 20 shows, consequently, with arrangement of the pick-up mechanism 3 with a right-hand suspension, the rails 60 are themselves suspended at the inside of the bend (arrow 76) in the right-hand bends, and at the outside of the bend, in left-hand bends (arrow 77) from the chassis frame. With left-hand suspension of the pick-up mechanism 3, suspension of the rails is carried out in the manner just described, but right-hand bends become left-hand bends and left-hand bends right-hand ones.

For the sake of completeness, it should also be pointed out that the links 61 (FIG. 16) are provided at their ends with slotted eyes 68 which provide compensation in the endless conveyor 21, e.g., when it traverses a curved section in the vertical plane, of the kind experienced when the conveyor 21 returns from the top to the bottom level 74. Conveniently, the ends of the links 61 will in each case be twisted in relation to the straight link section, to form the eyes 68 so that unnecessary welding operations are avoided.

In FIG. 21. finally, a particularly advantageous embodiment of the drive for the endless conveyor 21, in the preferred embodiment which employs carriages 26 guided in rails, has been illustrated. here to the rear cross member 80 of the chassis frame 1, a complete drive post 81 has been screwed, by means of two flange plates 82 and 83 with four full length screws 84, 85, 86, and 87. Centrally on the drive post 81, the one-piece drive shaft 31 is arranged to the bottom end of which a sprocket wheel 88 is attached so that it cannot perform relative rotation, by a key 89. Through the chain drive 32, the gear box 33 (see also FIG. 15) transmits a torque to the drive shaft 31. In the bottom zone, above the sprocket wheel 88, the drive shaft 31 is rotatably mounted in two bearings 90, 90'. The bearings 90, 90' are carried in bearing locations inside a bush 91 which is welded all round to a flange plate 82. The inner race of the bearing 90 carries the entire drive post 81 with the individual drives 92, 92' . . . A spacer bush 93 here ensures a corresponding interval between the bottom drive 92 and the cross member 80. Above the spacer bush 93 there is an internal segment 94 of a friction clutch 95 which is secured on the drive shaft 31 so that it cannot rotate in relation thereto, by a key 96. Between a thrust ring 97 and the inner segment 94, two linings 98, 99 and the drive wheel 71 for the endless conveyor 21, are trapped. Through a spring washer 100 or the like, the friction clutch 95 is loaded and adjusted by means of screws 101. The drives 92, 92' . . . are maintained at an appropriate interval, by spacer tubes 102, with bearing bushes 104. On the spacer tube 102, by means of brackets 103 with screws 103' and tubular arms 105, the rail 60 of the endless conveyor 21 is suspended. Likewise, insofar as they are required, the guide plates for the bales 7 are attached to the spacer tube 102, e.g., by welding. The bush 104 also carried a further drive 92' which is designed in exactly the same way as the bottom drive 92.

In order that when negotiating bends the bales 7 do not bind against the tubular arms 105, conveniently the entire bend will be covered over at the top by a plate 106.

Advantageously, two drive posts 81 of the aforedescribed kind will be secured to the cross member 80 and driven. Preferentially, each drive post 81 will be equipped with four drives 92, 92' . . . etcetera. Four drives 92, 92' . . . etcetera per drive post 81 correspond to four conveyor levels in the magazine 2.

In operation of the drive posts 81, from the chain drive 32, through the sprocket wheel 88 a torque is transmitted to the drive shaft 31. The drive shaft 31 rotates and with it the entire friction clutch 95. The linings 98, 99 drive the drive wheel 71 and this sets the carriages 26 of the endless conveyor 21 into motion. Here, as already mentioned, the movement of the endless conveyor 21 is an intermittent or continuous one depending upon how the gear box is controlled. If at any point in the conveyor magazine, a fault occurs due to bales 7 jamming or the like, then the drive wheel 71 halts and the system slips at the linings 98, 99, the same applies to all the other drive wheels 71 because they are coupled with the same endless conveyor course.

In a modification of any of the preceding embodiments it is possible to arrange for the bales picked up by the conveyor magazine 2 to be supplied not to a special discharge end, 5 thereof but instead discharged and unloaded, after complete filling of the magazine, by reversing the direction of operation of the conveyor 21 so that the bales exit at the pick-up end 4, i.e., leave in the opposite sequence to that in which they arrive at the time of loading; in this case, therefore, the last bale picked up would be the first to leave the magazine. The vehicle in accordance with the invention, furthermore, need not necessarily be a single or multi-axle trailer vehicle but could also equally well be self-propelled. It is fundamentally possible, too, to precede the vehicle in accordance with the invention directly, by a high-pressure baling press, or to incorporate such a press into the structure of the vehicle so that then the pick-up mechanism 3 would be superfluous and the bales arriving at the press could be directed straight into the conveyor magazine. This kind of combination of press and vehicle in accordance with the invention would of course by very expensive and would not make it possible to facilitate the work of the presses already employed in large numbers in agriculture, by making the loading, transportation and unloading of the bales coming from such presses easier. Also, with the kind of combination mentioned, the relatively low press performance could not readily be harmonised with the high rate of pick-up by the conveyor magazine. Finally, it ought to be mentioned that in order to carry out all the drive and/or control functions in the vehicle, it is possible not only to use mechanical but also hydraulic means; again electrical trips or controls are possible.

We claim:

1. A vehicle for receiving, transporting, storing and discharging bales of hay and the like, comprising:
a frame defining a load space;
an endless conveyor operatively mounted on said frame and extending along a convoluted path through said load space, said path having a bale receiving and a bale discharging end defining a plurality of superposed horizontal planes in said load space;
bale pick-up means operatively connected to said bale receiving end of the conveyor and adapted to pick up bales directly from the ground and deliver them to said bale discharging end of said conveyor;
a drive mechanism operatively connected to said conveyor and adapted to move said conveyor in a stepwise manner along a distance corresponding to the length or width of a bale to thereby store the bales in said plurality of superposed horizontal planes in said load space; and
means operatively connected to said conveyor for sensing the longitudinal extent of each picked up bale along said path and adjusting the length of the steps of the stepwise movement of said conveyor in response thereto.

2. A vehicle as claimed in claim 1, wherein the path of the conveyor extends along four superposed horizontal planes in a direction longitudinally of the vehicle, with a total of three approximately 180° changes of direction, and once in a transverse direction, with two 90° changes of direction.

3. A vehicle as claimed in claim 1, wherein the conveyor passes from one horizontal plane to the next along a straight portion of its path.

4. A vehicle as claimed in claim 1 wherein the drive mechanism is selectively operable to advance the bales in a continuous movement.

5. A vehicle as claimed in claim 1 wherein the bale receiving end is at a bottom region of the load space, and the bale discharge end is at a top region of the load space.

6. A vehicle as claimed in claim 1, wherein there are means operatively connected to the conveyor for reversing the direction of motion of the conveyor, whereby to discharge the bales successively via the bale-receiving end.

7. A vehicle as claimed in claim 1 comprising means operatively connected to the conveyor for orientating each bale on the conveyor such that a plane defined by binder circumscribing the bale is disposed parallel to the conveyor plane.

8. A vehicle as claimed in claim 1 wherein said pick-up means comprises means for orientating each bale on the conveyor such that a plane defined by binder circumscribing the bale is disposed parallel to the conveyor plane.

9. A vehicle as claimed in claim 8 wherein the pick-up means comprises a second conveyor and a conveyor channel each of which are twisted helically through at least 45°.

10. A vehicle as claimed in claim 1 wherein the conveyor is endless and consists of carriages articulated together and guided by a rail, said carriages comprising means for engaging the bales.

11. A vehicle as claimed in claim 10, wherein the drive mechanism comprises a drive wheel which engages the carriages to transmit movement thereto.

12. A vehicle as claimed in claim 11 wherein the drive mechanism comprises a drive wheel which engages the carriages, a shaft supporting a said drive wheel and means supporting the shaft only at one end.

13. A vehicle as claimed in claim 10, wherein the bales are guided on the conveyor by guide means defining a channel which widens in the plane of curvature at bends in the conveyor.

14. A vehicle as claimed in claim 10, wherein the carriages comprise extension portions which pass around outwardly facing parts of the guide rails.

15. A vehicle as claimed in claim 14, comprising means attaching each extension portion to its carriage beneath the rail, the rail being closed at its top and sides.

16. A vehicle as claimed in claim 15, wherein the drive mechanism comprises a drive wheel engaging each carriage between the extension portion and a portion of the carriage disposed within the rail.

17. A vehicle as claimed in claim 14 wherein the drive mechanism comprises a drive wheel which engages the carriages beneath the rail.

18. A vehicle as claimed in claim 14, wherein the extension portions are generally sickle-shaped viewed in the direction of movement of the carriage.

19. A vehicle as claimed in claim 14 wherein the extension portions carry said means for engaging the bales.

20. A vehicle as claimed in claim 19, wherein the extension portions carry means for engaging bales in adjacent horizontal planes above and below the rail.

21. A vehicle as claimed in claim 10, wherein the pick-up means is disposed at the right-hand side of the vehicle relative to the direction of travel thereof, the rail being supported at the inside of right-hand bends of the conveyor and at the outside of left-hand bends of the conveyor.

22. A vehicle as claimed in claim 10, wherein the pick-up means is disposed at the left-hand side of the vehicle the direction of travel thereof, the rail being supported at the inside of left-hand bends of the conveyor and at the outside of right-hand bends of the conveyor.

23. A vehicle as claimed in claim 10, wherein the carriages are articulated via links whose ends are twisted in relation to the link, to form eyes.

24. A vehicle as claimed in claim 23, wherein the drives are arranged in curved portions of the conveyor at the rear of the vehicle.

25. A vehicle as claimed in claim 1, comprising means operatively connected to the drive mechanism for sensing the arrival of a bale at the discharge end.

26. A vehicle as claimed in claim 1 comprising means to sense the arrival of a bale at the discharge position.

27. A vehicle as claimed in claim 1 wherein the drive mechanism comprises means to provide drives to the conveyor at a plurality of said horizontal planes.

28. A vehicle as claimed in claim 27, comprising means operatively connected to the drive mechanism to control the said drives commonly and simultaneously.

29. A vehicle as claimed in claim 27, wherein each of said drives comprises a friction clutch which can be set to slip at a predetermined torque.

* * * * *